(12) United States Patent
Kakemizu et al.

(10) Patent No.: US 9,551,403 B2
(45) Date of Patent: Jan. 24, 2017

(54) V-BELT CONTINUOUSLY VARIABLE TRANSMISSION

(71) Applicant: HONDA MOTOR CO., LTD., Tokyo (JP)

(72) Inventors: Kenichiro Kakemizu, Wako (JP); Go Morita, Wako (JP); Hiroyasu Yoshizawa, Wako (JP); Kohei Matsuura, Wako (JP); Hirokazu Komuro, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 230 days.

(21) Appl. No.: 14/496,171

(22) Filed: Sep. 25, 2014

(65) Prior Publication Data

US 2015/0094176 A1 Apr. 2, 2015

(30) Foreign Application Priority Data

| Sep. 30, 2013 | (JP) | 2013-204580 |
| Sep. 30, 2013 | (JP) | 2013-204582 |
| Apr. 16, 2014 | (JP) | 2014-084503 |

(51) Int. Cl.
*F16H 9/16* (2006.01)
*B62K 11/06* (2006.01)
(Continued)

(52) U.S. Cl.
CPC ............... *F16H 9/16* (2013.01); *B62K 11/06* (2013.01); *B62M 9/04* (2013.01); *F16H 9/18* (2013.01);
(Continued)

(58) Field of Classification Search
CPC ............ F16H 9/16; F16H 9/18; F16H 55/563; F16H 55/035; F16H 57/035; F16H 63/062; B62K 11/06; B62M 9/04
See application file for complete search history.

(56) References Cited

U.S. PATENT DOCUMENTS

| 2004/0018903 A1* | 1/2004 | Takagi | F16H 55/563 474/8 |
| 2010/0167853 A1* | 7/2010 | Morita | F16H 9/18 474/13 |
| 2013/0090198 A1* | 4/2013 | Itoo | F16H 57/03 474/93 |

FOREIGN PATENT DOCUMENTS

| JP | 2012-184788 A | 9/2012 |
| JP | 5241642 B2 | 4/2013 |

* cited by examiner

*Primary Examiner* — William E Dondero
*Assistant Examiner* — Robert T Reese
(74) *Attorney, Agent, or Firm* — Birch, Stewart, Kolasch & Birch, LLP

(57) ABSTRACT

A V-belt continuously variable transmission in which an actuator unit for driving a movable sheave is slidably supported by a transmission case that is formed by fastening a plurality of case members with a plurality of fastening members, for ensuring a sufficient space for slidably moving the actuator unit and enhancing workability of mounting and dismounting operation of the actuator unit. A flat mounting surface for mounting the actuator unit is formed on an outer surface of the transmission case. Also, a recessed portion recessed inwardly of the transmission case from the mounting surface is formed to have at an inner end thereof a fastening seat face for a specific fastening member out of the plurality of fastening members, the specific fastening member being disposed at a portion corresponding to the mounting surface. The whole specific fastening member is disposed inwardly of the transmission case relative to the mounting surface.

20 Claims, 14 Drawing Sheets

(51) Int. Cl.
*F16H 63/06* (2006.01)
*F16H 9/18* (2006.01)
*B62M 9/04* (2006.01)
F16H 55/56 (2006.01)
F16H 57/035 (2012.01)

(52) U.S. Cl.
CPC ......... *F16H 63/062* (2013.01); *B62K 2202/00* (2013.01); *F16H 55/563* (2013.01); *F16H 57/035* (2013.01)

V-BELT CONTINUOUSLY VARIABLE TRANSMISSION

CROSS-REFERENCE TO RELATED APPLICATIONS

The present application claims priority under 35 USC 119 to Japanese Patent Application No. 2013-204582 filed Sep. 30, 2013; Japanese Patent Application No. 2013-204580 filed Sep. 30, 2013 and Japanese Patent Application No. 2014-084503 filed Apr. 16, 2014 the entire contents of which are hereby incorporated by reference.

BACKGROUND OF THE INVENTION

1. Field of the Invention

The present invention relates to a V-belt continuously variable transmission. The V-belt continuously variable transmission includes a fixed sheave fixed to a driving shaft, a movable sheave movable toward or away from the fixed sheave in a direction along an axis of the driving shaft and supported by the driving shaft, a coupling arm supported by the movable sheave through a rolling bearing, or provided with an engaged portion and a V-belt wound between the fixed sheave and the movable sheave. The fixed sheave, the movable sheave, the coupling arm, and the V-belt are stored in a transmission case that is formed by fastening a plurality of dividable case members with a plurality of fastening members. The V-belt continuously variable transmission further includes an actuator unit that causes an output member or an engaging portion engageable with the engaged portion to move in a direction parallel to the axis of the driving shaft with power from an actuator. The actuator unit is supported by the transmission case slidably in a direction perpendicular to the axis of the driving shaft between an engagement position, where the actuator unit is mounted to the transmission case from the outside by engaging the output member with the coupling arm so that the movement of the output shaft can be transmitted to the movable sheave or the engaging portion with the engaged portion so as to allow transmission of the movement of the output shaft to the movable sheave, and a disengagement position, where the actuator unit is not mounted to the transmission case and the output member is disengaged from the coupling arm or the engaging portion is disengaged from the engaged portion.

The V-belt continuously variable transmission may include an actuator unit for causing an output member engageable with the coupling arm to move in a direction parallel to the axis of the driving shaft with power from an actuator, the actuator unit being mounted to the transmission case so that the movement of the output member is transmitted to the movable sheave through the coupling arm and the rolling bearing. The coupling arm may be composed of a first member and a second member, the first member being mounted to the rolling bearing, the second member being engageable with the output member and mounted to the first member by a mounting member.

2. Description of Background Art

A V-belt continuously variable transmission is disclosed in JP Patent No. 5241642. An actuator unit is slid in a direction perpendicular to an axis of a driving shaft, thereby switching an engaging portion of an output shaft included in an actuator unit between an engagement position, where the engaging portion is engaged with an engaged portion of a coupling arm supported by a movable sheave through a rolling bearing, and a disengagement position, where the engaging portion is disengaged from the engaged portion. Thus, clearance for permitting the slide movement of the actuator unit is set between the transmission case and the actuator unit supported by the transmission case, thereby allowing installation and removal of the actuator unit.

Meanwhile, the transmission case is often formed by fastening a plurality of dividable case members with a plurality of fastening members, and in the case where the construction disclosed in JP Patent No. 5241642 is applied to such a transmission case, depending on the arrangement of the fastening members, some fastening members may interfere with the slide movement of the actuator unit, and it may be difficult to ensure the clearance for permitting the slide movement of the actuator unit between the transmission case and the actuator unit as disclosed in JP Patent No. 5241642. In this case, unfortunately, it is necessary to perform the engagement/disengagement between the engaging portion and the engaged portion while slidably moving the actuator unit in a limited narrow space, resulting in deterioration in workability.

A V-belt continuously variable transmission is disclosed in JP-A No. 2012-184788, wherein an output member is engaged with and coupled to a coupling arm supported by a movable sheave through a rolling bearing that is moved in a direction parallel to an axis of a driving shaft, thereby axially driving the movable sheave. The coupling arm is composed of a first member mounted to the rolling bearing and a second member engageable with the output member and mounted to the first member by a mounting member.

SUMMARY AND OBJECTS OF THE INVENTION

Accordingly, the present invention has been made in view of the foregoing, and an object of an embodiment of the present invention is to provide a V-belt continuously variable transmission capable of ensuring a sufficient space for slidably moving an actuator unit for enhancing the workability for mounting and dismounting the actuator unit.

In order to accomplish the above-mentioned object, according to an embodiment of the present invention, a V-belt continuously variable transmission includes a fixed sheave fixed to a driving shaft, a movable sheave movable toward or away from the fixed sheave in a direction along an axis of the driving shaft and supported by the driving shaft, a coupling arm supported by the movable sheave through a rolling bearing or provided with an engaged portion and a V-belt wound between the fixed sheave and the movable sheave. The fixed sheave, the movable sheave, the coupling arm, and the V-belt are stored in a transmission case that is formed by fastening a plurality of dividable case members with a plurality of fastening members. The V-belt continuously variable transmission further includes an actuator unit that causes an output member or an engaging portion engageable with the engaged portion to move in a direction parallel to the axis of the driving shaft with power from an actuator. The actuator unit is supported by the transmission case slidably in a direction perpendicular to the axis of the driving shaft between an engagement position, where the actuator unit is mounted to the transmission case from the outside by engaging the output member with the coupling arm or the engaging portion with the engaged portion so that the movement of the output shaft can be transmitted to the movable sheave, and a disengagement position, where the actuator unit is not mounted to the transmission case and the output member is disengaged from the coupling arm or the engaging portion is disengaged from the engaged portion. A flat mounting surface for mounting the actuator unit is formed on an outer surface of the transmission case. Also, a recessed portion recessed inwardly of the transmission case from the mounting surface is formed to have at an inner end thereof a fastening seat face for a specific fastening member out of the plurality of fastening members, the specific fastening member being disposed at a portion corresponding to the mounting surface. The whole specific fastening member is disposed inwardly of the transmission case relative to the mounting surface.

According to an embodiment of the present invention, the actuator unit is provided with a shielding member that covers from the outside at least a portion of the recessed portion in a state in which the actuator unit being in the engagement position is mounted to the mounting surface.

According to an embodiment of the present invention, a first through hole allowing insertion of the actuator and a second through hole allowing insertion of the output member are formed in spaced relation to each other in the mounting surface.

According to an embodiment of the present invention, a rib disposed between the first and second through holes is provided in a projecting manner on an inner surface of the transmission case.

According to an embodiment of the present invention, the transmission case extending in a vehicle front-rear direction is supported on a body frame of a saddle-ride type vehicle and provided with an arm supporting portion that supports the coupling aim by abutting on the coupling arm from below with the output member disengaged from the coupling arm.

According to an embodiment of the present invention, with the output member engaged with the coupling arm, the arm supporting portion is separated from the coupling arm.

According to an embodiment of the present invention, an arm portion abutting on the output member from above in an engagement process of the output member with the coupling arm is provided on the coupling arm so that the coupling arm is separated from the arm supporting portion by abutment of the arm portion on the output member.

According to an embodiment of the present invention, the output member and the coupling arm are engaged through a ball joint that absorbs a force generated between the output member and the coupling arm in a direction to tilt the movable sheave along with the movement of the output member.

According to an embodiment of the present invention, the recessed portion recessed inwardly from the flat mounting surface formed on the outer surface of the transmission case for mounting the actuator unit is formed on the outer surface of the transmission case so as to have at an inner end thereof the fastening seat face for the specific fastening member out of the plurality of fastening members, the specific fastening member is disposed at a portion corresponding to the mounting surface. The whole specific fastening member is disposed inwardly of the transmission case relative to the mounting surface. Thus, the specific fastening member disposed on the periphery of the actuator unit is prevented from projecting outwardly from the mounting surface. Thus, the actuator unit can be brought into sliding contact with the whole mounting surface including the portion where the recessed portion is disposed. Consequently, a sufficient space for slidably moving an actuator unit can be ensured and the mounting/dismounting workability of the actuator unit can be enhanced.

Furthermore, according to an embodiment of the present invention, at least a portion of the recessed portion with the actuator unit mounted to the mounting surface is covered from the outside with the shielding member provided on the actuator unit. Thus, the fastening of the fastening member can be hardly released unless the actuator unit is removed from the transmission case. Also, with the engaging portion on the side of the actuator unit engaged with the engaged portion on the side of the movable sheave, the transmission case can be prevented from being forcibly disassembled.

According to an embodiment of the present invention, the first through hole allowing insertion of the actuator and the second through hole allowing insertion of the output member are formed in a spaced relation to each other in the mounting surface. Thus, the rigidity of the transmission case can be enhanced by interposing a portion of the side wall of the transmission case between the first and second through holes. It is therefore possible to support the actuator unit while sufficiently withstanding the load from the actuator unit when the movable sheave is moved in the axial direction of the driving shaft, and to accurately move the movable sheave with the output rod.

According to an embodiment of the present invention, the rib disposed between the first and second through holes is provided in a projecting manner on an inner surface of the transmission case. Thus, the rigidity of the transmission case can be further enhanced.

According to an embodiment of the present invention, the transmission case extending in the vehicle front-rear direction and supported on the body frame is provided with the arm supporting portion that supports the coupling arm by abutting on the coupling arm from below with the output member disengaged from the coupling arm or with the engaging portion disengaged from the engaged portion. It is therefore possible to support the coupling arm in a predetermined position by supporting it with the arm supporting portion from below with the output member disengaged from the coupling arm or with the engaging portion disengaged from the engaged portion. Thus, when sliding the actuator unit from the disengagement position to the engagement position, the engagement of the engaging portion with the engaged portion is facilitated and the mountability of the actuator unit is enhanced.

According to an embodiment of the present invention, with the output member engaged with the coupling arm or the engaging portion engaged with the engaged portion, the arm supporting portion is separated from the coupling arm. It is therefore possible to prevent the occurrence of wear and noise due to the sliding contact of the coupling arm with the arm supporting portion when the movable sheave is driven in the axial direction by the movement of the output member.

Further, according to an embodiment of the present invention, the arm portion provided on the coupling arm abuts on the output member from above in the engagement process of the engaging portion with the engaged portion, and the coupling arm is separated from the arm supporting portion by the abutment of the arm portion on the output member. Thus, when the output member is coupled to the coupling arm by engaging the engaging portion with the engaged portion, the coupling arm is lifted and separated from the output member, thereby allowing the preventing of the occurrence of wear and noise due to the sliding contact of the coupling arm with the arm supporting portion.

Further, according to an embodiment of the present invention, the output member and the coupling arm are engaged through the ball joint, thereby allowing prevention of a high load on an engagement portion between the output member and the coupling arm.

According to an embodiment of the present invention, the reason why the coupling arm is composed of two members is to both ensure the rigidity and durability. A reduction in weight is achieved by forming the first and second members of different materials. However, in the related art disclosed in JP-A No. 2012-184788, because the mounting member for mounting the second member to the first member is disposed side by side with the output shaft in a direction parallel to the axis of the driving shaft, the size in an axial direction is likely to increase. Thus, an increase in the size in the axial direction becomes more remarkable if the stroke of the output member is sufficiently ensured. Furthermore, in the related art disclosed in JP-A No. 2012-184788, because the mounting member is located at a position farther away from the driving shaft than the output member, loads on the first and second members are likely to increase, particularly in a portion where the mounting member is disposed, and the force in a direction in which the movable sheave tilts is likely to increase. Therefore, in the related art disclosed in JP-A 2012-184788, a structure for dispersing the load at a portion close to the driving shaft relative to the portion where the mounting member is disposed is provided on the movable sheave side and on the output member side. This causes a problem that the coupling arm also increases in size.

According to an embodiment of the present invention, an object of the present invention is to provide a V-belt continuously variable transmission capable of preventing an increase in the size of a coupling arm by reducing loads applied to first and second members in a portion where a mounting member is disposed, and capable of preventing an increase in size around an engaging/coupling portion between an output shaft and the coupling arm in a direction of an axis of a driving shaft.

In order to accomplish the above-mentioned object, according to an embodiment of the present invention, a V-belt continuously variable transmission is provided that includes a fixed sheave fixed to a driving shaft, a movable sheave movable toward or away from the fixed sheave in a direction along an axis of the driving shaft and supported by the driving shaft, a coupling arm supported by the movable sheave through a rolling bearing and a V-belt wound between the fixed sheave and the movable sheave. The fixed sheave, the movable sheave, the coupling arm, and the V-belt are stored in a transmission case. The V-belt continuously variable transmission further includes an actuator unit for causing an output member engageable with the coupling arm to move in a direction parallel to the axis of the driving shaft with power from an actuator. The actuator unit is mounted to the transmission case so that the movement of the output member is transmitted to the movable sheave through the coupling arm and the rolling bearing. The coupling arm is composed of a first member and a second member, the first member being mounted to the rolling bearing, the second member being engageable with the output member and mounted to the first member by a mounting member. The mounting member is located between the output shaft and the driving shaft in a direction perpendicular to the axis of the driving shaft and disposed in a position overlapping at least a portion of the output shaft in a radial direction of the driving shaft.

According to an embodiment of the present invention, the first member is formed with a boss portion for mounting the mounting member, and a moving end of the output member when moving in a direction to be extruded from the actuator unit is restricted by abutment of the boss portion on the transmission case.

According to an embodiment of the present invention, the second member is formed with stoppers that abut on an outer surface of the actuator unit to thereby restrict a moving end of the output member when moving in a direction to be retracted into the actuator unit.

According to an embodiment of the present invention, the transmission case extending in a vehicle front-rear direction is supported on a body frame of a saddle-ride type vehicle, the driving shaft having an axis extending in a vehicle width direction is supported by the transmission case and the second member having a mating surface with the first member is mounted to the first member by a mounting operation of the mounting member from outside in the vehicle width direction. The mating surface being along a plane perpendicular to the axis of the driving shaft, the mounting member having an axis parallel to the axis of the driving shaft.

According to an embodiment of the present invention, a driven shaft rotationally driven by power transmitted from the V-belt is disposed rearwardly of the driving shaft and stored in the transmission case, and the mounting member is disposed on a straight line connecting the axes of the driving shaft and the driven shaft.

According to an embodiment of the present invention, the actuator unit is supported by the transmission case so that, with the output member disengaged and uncoupled from the coupling arm, the actuator unit can advance from further rearward than the mounting member to slide in the direction perpendicular to the axis of the driving shaft, and the output rod is engaged with and coupled to the coupling arm in an advance position of the actuator unit.

According to an embodiment of the present invention, an engaged portion for engaging an engaging portion provided on the output member is provided on the second member and formed with a guide portion that is inclined upwardly with a distance from the driving shaft for guiding the engaging portion.

According to an embodiment of the present invention, the transmission case is provided with an arm supporting portion that supports the coupling arm by abutting on the coupling arm from below with the engaging portion disengaged from the engaged portion.

According to an embodiment of the present invention, with the engaging portion engaged with the engaged portion, the arm supporting portion is separated from the coupling arm.

According to an embodiment of the present invention, an arm portion abutting on the output member from above in an engagement process of the engaging portion with the engaged portion is provided on the coupling arm so that the coupling arm is separated from the arm supporting portion by abutment of the arm portion on the output member.

According to an embodiment of the present invention, in order to constitute the coupling arm supported by the movable sheave through the rolling bearing, the mounting member for mounting the second member engageable with the output member to the first member is located between the output member and the driving shaft in a direction perpendicular to the axis of the driving shaft. Therefore, the mounting member can be disposed close to the driving shaft, thereby allowing a reduction in the loads applied to the coupling arm in a portion where the mounting member is disposed and allowing miniaturization of the coupling arm. In addition, because the mounting member is disposed at a position overlapping at least a portion of the output member in the radial direction of the driving shaft, the coupling arm can be also miniaturized in the axial direction of the driving shaft.

According to an embodiment of the present invention, the boss portion formed on the first member for mounting the mounting member abuts on the transmission case, thereby restricting the moving end of the output member when moving in a direction to be extruded from the actuator unit. Thus, the number of components can be reduced by causing the boss portion to also serve as a stopper. In addition, because the boss portion is disposed at a position close to the driving shaft relative to the output member, even if a pressure is applied from the output member to the coupling arm by a force that is more than required, the force applied in a direction in which the movable sheave tilts can be reduced.

According to an embodiment of the present invention, the stoppers formed on the second member abut on an outer surface of the actuator unit, thereby restricting the moving end of the output member when moving in a direction to be retracted into the actuator unit. Thus, the number of components can be reduced by utilizing the outer surface of the actuator unit. In addition, because the stoppers are disposed at a position close to the driving shaft relative to the output member, even if a pressure is applied from the output member to the coupling arm by a force more than is required, the force applied in a direction in which the movable sheave tilts can be reduced.

According to an embodiment of the present invention, the driving shaft with the axis extending in the vehicle width direction is supported by the transmission case extending in the front-rear direction, and the second member has the mating surface with the first member, the mating surface being along a plane perpendicular to the axis of the driving shaft. Also, the mounting member having the axis parallel to the axis of the driving shaft is mounted to the first member from the outside in the vehicle width direction. Thus, access to the mounting member from the outside is facilitated and the mounting workability of the mounting member is improved.

According to an embodiment of the present invention, the driven shaft rotationally driven by the power transmitted from the V-belt is disposed at the rear of the driving shaft, and the mounting member is disposed on the straight line connecting the axes of the driven shaft and the driving shaft. It is therefore possible to effectively prevent the V-belt vertically swinging from interfering with the mounting member.

According to an embodiment of the present invention, the actuator unit is supported by the transmission case so that the actuator unit can advance from further rearward than the mounting member to slide in the direction perpendicular to the axis of the driving shaft, and the output member is engaged with and coupled to the coupling arm in an advance position of the actuator unit. It is therefore possible to prevent the mounting member from becoming an obstacle in the sliding direction at the time of the slide movement of the actuator unit.

According to an embodiment of the present invention, the engaged portion, which is provided on the second member for engaging the engaging portion provided on the output member, is formed with the guide portion for guiding the engaging portion. Thus, the engagement of the engaging portion with the engaged portion can be facilitated.

According to an embodiment of the present invention, the transmission case extending in the front-rear direction and supported by the vehicle body is provided with the arm supporting portion that supports the coupling arm by abutting on the coupling arm from below with the engaging portion disengaged from the engaged portion. It is therefore possible to support the coupling arm in a predetermined position by supporting it with the arm supporting portion from below with the engaging portion disengaged from the engaged portion. Thus, when sliding the actuator unit from the disengagement position to the engagement position, the engagement of the engaging portion with the engaged portion is facilitated and the mountability of the actuator unit is enhanced.

According to an embodiment of the present invention, with the engaging portion engaged with the engaged portion, the arm supporting portion is separated from the coupling arm. It is therefore possible to prevent the occurrence of wear and noise due to the sliding contact of the coupling arm with the arm supporting portion when the movable sheave is driven in the axial direction by the movement of the output member.

According to an embodiment of the present invention, the arm portion provided on the coupling arm abuts on the output member at least from above in the engagement state of the engaging portion with the engaged portion, and the coupling arm is separated from the arm supporting portion by the abutment of the arm portion on the output member. Thus, when the output member is coupled to the coupling arm by engaging the engaging portion with the engaged portion, the coupling arm is lifted and separated from the output member, thereby allowing the prevention of the occurrence of wear and noise due to the sliding contact of the coupling arm with the arm supporting portion.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, an embodiment of the present invention will be described referring to the attached drawings. It is to be noted that, in the following description, the terms, such as front, rear, left, right, up, and down, refer to the respective directions as viewed by an occupant riding on a motorcycle.

Figure 1:
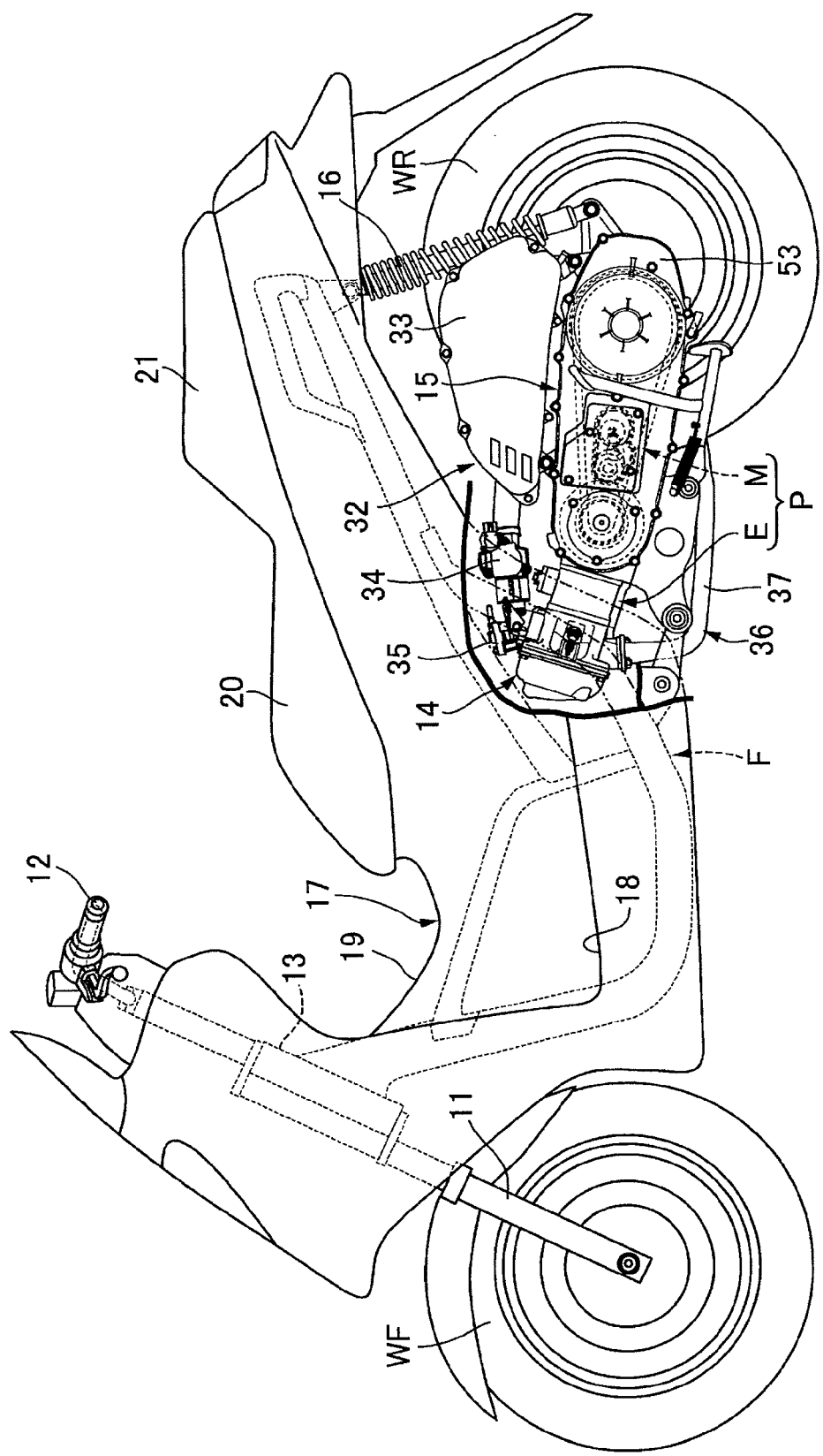
FIG. 1 is a side view of a motorcycle of a first embodiment.

A first embodiment of the present invention will be described with reference to FIGS. 1 to 8. As illustrated in FIG. 1, the saddle-ride type vehicle is a scooter-type motorcycle with a body frame F of the motorcycle including at a front end thereof, a front fork 11 for journaling a front wheel WF, and a head pipe 13 coupled to the front fork 11 for steerably supporting a steering handlebar 12. A power unit P that exerts power for driving a rear wheel WR is supported in a vertically swingable manner at a longitudinally intermediate portion of the body frame F.

The power unit P is composed of an engine E disposed forwardly of the rear wheel WR, and a transmission device M for transmitting output of the engine E to the rear wheel WR. The transmission device M is stored in a transmission case 15 that is continuous with an engine body 14 of the engine E to extend to the left of the rear wheel WR. A rear shock absorber unit 16 is provided between rear portions of the transmission case 15 and the body frame F.

The body frame F and a portion of the power unit P are covered with a body cover 17 that has a pair of left and right footrest portions 18 for placing occupant's feet and a floor tunnel portion 19 raised upwardly between both footrest portions 18. The body cover 17 is mounted to the body frame F. In addition, an occupant seat 20 disposed at the rear of the floor tunnel portion 19 with a passenger seat 21 disposed at the rear of the occupant seat 20 being arranged on the body cover 17.

Figure 2:
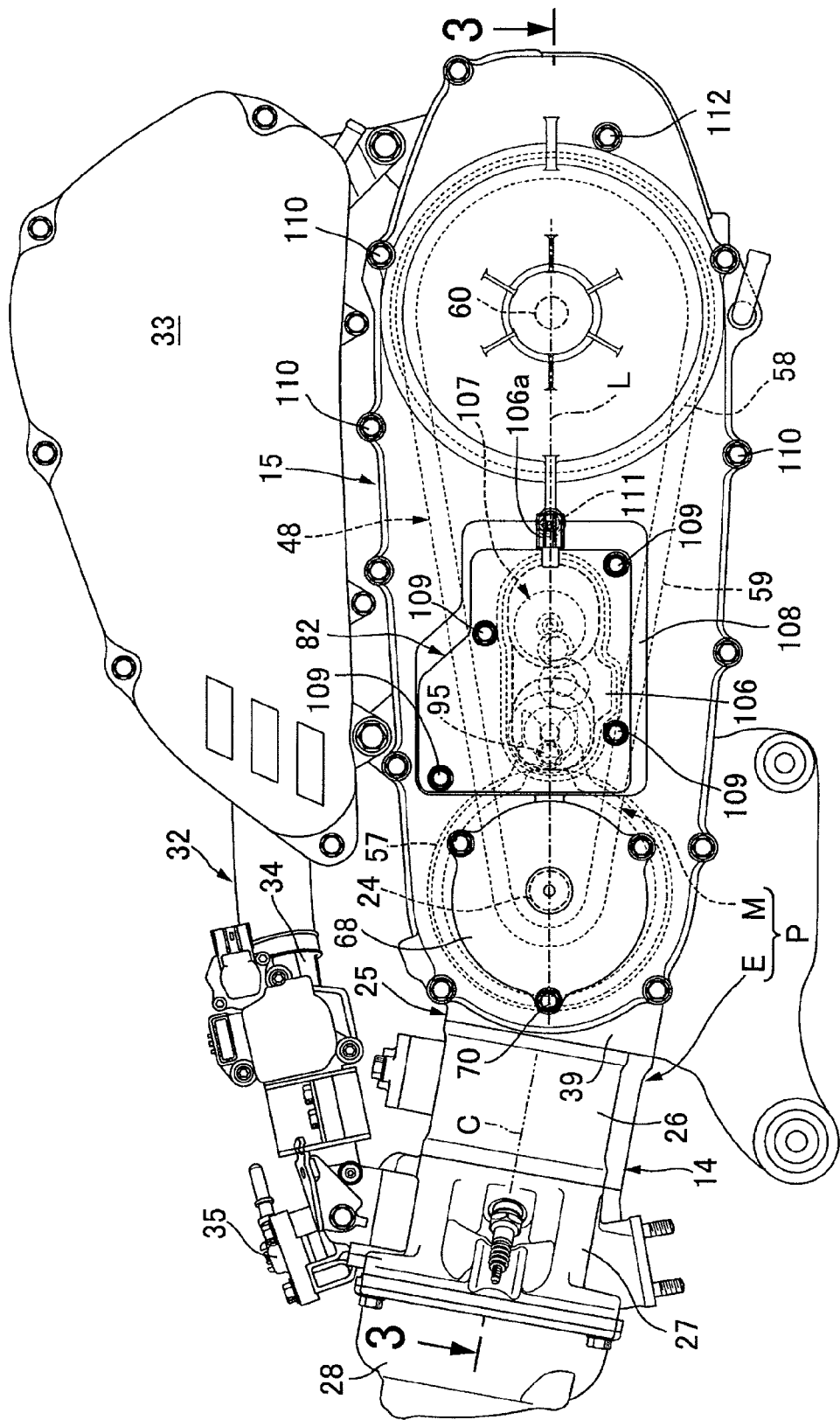
FIG. 2 is a side view of a power unit.
Figure 3:
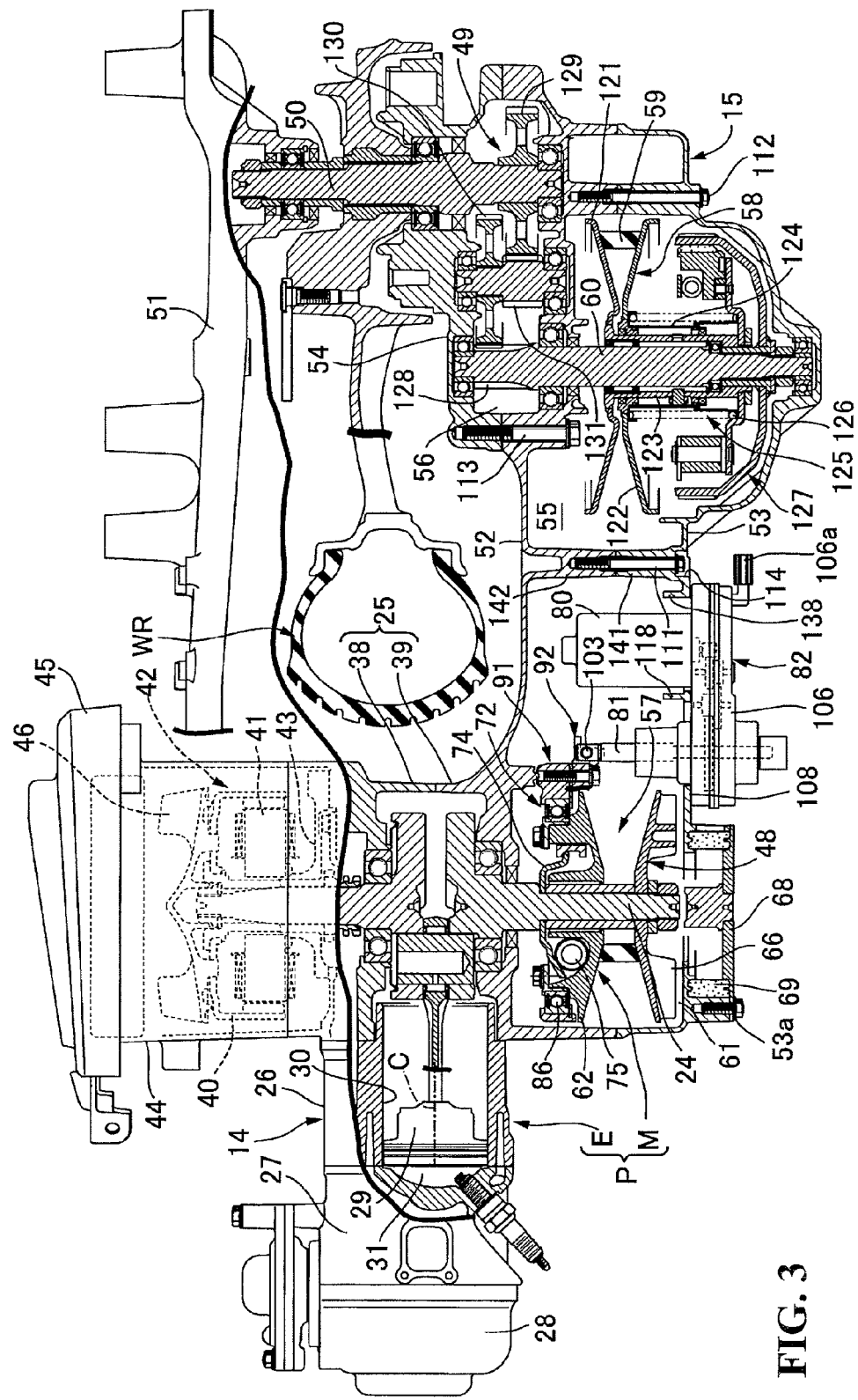
FIG. 3 is a sectional view taken along line 3-3 of FIG. 2.

Referring also to FIGS. 2 and 3, the engine body 14 of the engine E includes a crankcase 25 that rotatably supports a crankshaft 24 having an axis extending in a vehicle width direction, a cylinder block 26 that has a cylinder bore 30 allowing a piston 29 to be slidably fitted therein, and is connected to the crankcase 25, a cylinder head 27 that is connected to the cylinder block 26 and a head cover 28 that is connected to the cylinder head 27. A cylinder axis C of the engine body 14, that is, an axis of the cylinder bore 30, is inclined slightly upwardly toward the front, and the piston 29 is connected to the crankshaft 24.

An intake system 32 for supplying air to a combustion chamber 31, which is formed between the cylinder block 26 and the cylinder head 27 and into which a top portion of the piston 29 faces, includes an air cleaner 33 disposed above the transmission case 15 to the left of the rear wheel WR and supported by the transmission case 15 and a throttle body 34 disposed between the air cleaner 33 and the cylinder head 27. A fuel injection valve 35 is mounted to an upper sidewall of the cylinder head 27.

As shown in FIG. 1, an exhaust system 36 for discharging exhaust gas from the combustion chamber 31 is connected to a lower sidewall of the cylinder head 27. The exhaust system 36 includes an exhaust pipe 37 that passes below the engine body 14 and extends rearwardly from the lower sidewall of the cylinder head 27 and an exhaust muffler (not shown) that is disposed to the right of the rear wheel WR to be connected to a downstream end of the exhaust pipe 37.

The crankcase 25 is composed of a combination of a first case half body 38 on the right side and a second case half body 39 on the left side. An outer rotor 40 is fixed to a right end of the crankshaft 24 passing rotatably through the first case half body 38. An inner stator 41 is provided that constitutes a generator 42 along with the outer rotor 40. The outer rotor 40 is fixed to a supporting plate 43 fastened to the first case half body 38.

A cylindrical generator cover 44 surrounding the generator 42 is connected to the first case half body 38, and a radiator 45 is disposed on the right side of the generator cover 44. A cooling fan 46 for causing cooling air to circulate in the radiator 45 is disposed between the generator 42 and the radiator 45 and fixed to the crankshaft 24.

The transmission device M, which is stored in the transmission case 15 to transmit rotational power of the crankshaft 24 to the rear wheel WR, includes a V-belt continuously variable transmission 48 that continuously shifts the rotational power transmitted from the crankshaft 24, and a reduction gear mechanism 49 that decelerates the rotational power from the V-belt continuously variable transmission 48 and transmits it to an axle 50 of the rear wheel WR. The rear wheel WR is disposed in such a manner so as to be sandwiched between the transmission case 15 and a support arm 51, the support arm 51 being continuous with the first case half body 38 of the crankcase 25 to extend to the right of the rear wheel WR. Both ends of the axle 50 are journaled by rear ends of the transmission case 15 and the support arm 51.

The transmission case 15 is formed by fastening a plurality of dividable case members together. In this embodiment, a case main body 52 serving as a first case member that integrally includes the second case half body 39 and extends rearwardly from a left side wall of the crankcase 25 to the side of the rear wheel WR, a case cover 53 serving as a second case member that forms a transmission chamber 55 for storing the V-belt continuously variable transmission 48 between the case main body 52 and itself and is fastened to the case main body 52 and a gear cover 54 serving as a third case member that forms a gear chamber 56 for storing the reduction gear mechanism 49 between the case main body 52 and itself and is fastened to a rear portion of the case main body 52.

The V-belt continuously variable transmission 48 includes a driving pulley 57 that is provided on the crankshaft 24 serving as a driving shaft so that a belt winding diameter is variable, a driven pulley 58 that is provided on a driven shaft 60 disposed rearwardly of the crankshaft 24 and stored in the transmission case 15 and an endless V-belt 59 that is wound around the driving pulley 57 and the driven pulley 58.

Figure 4:
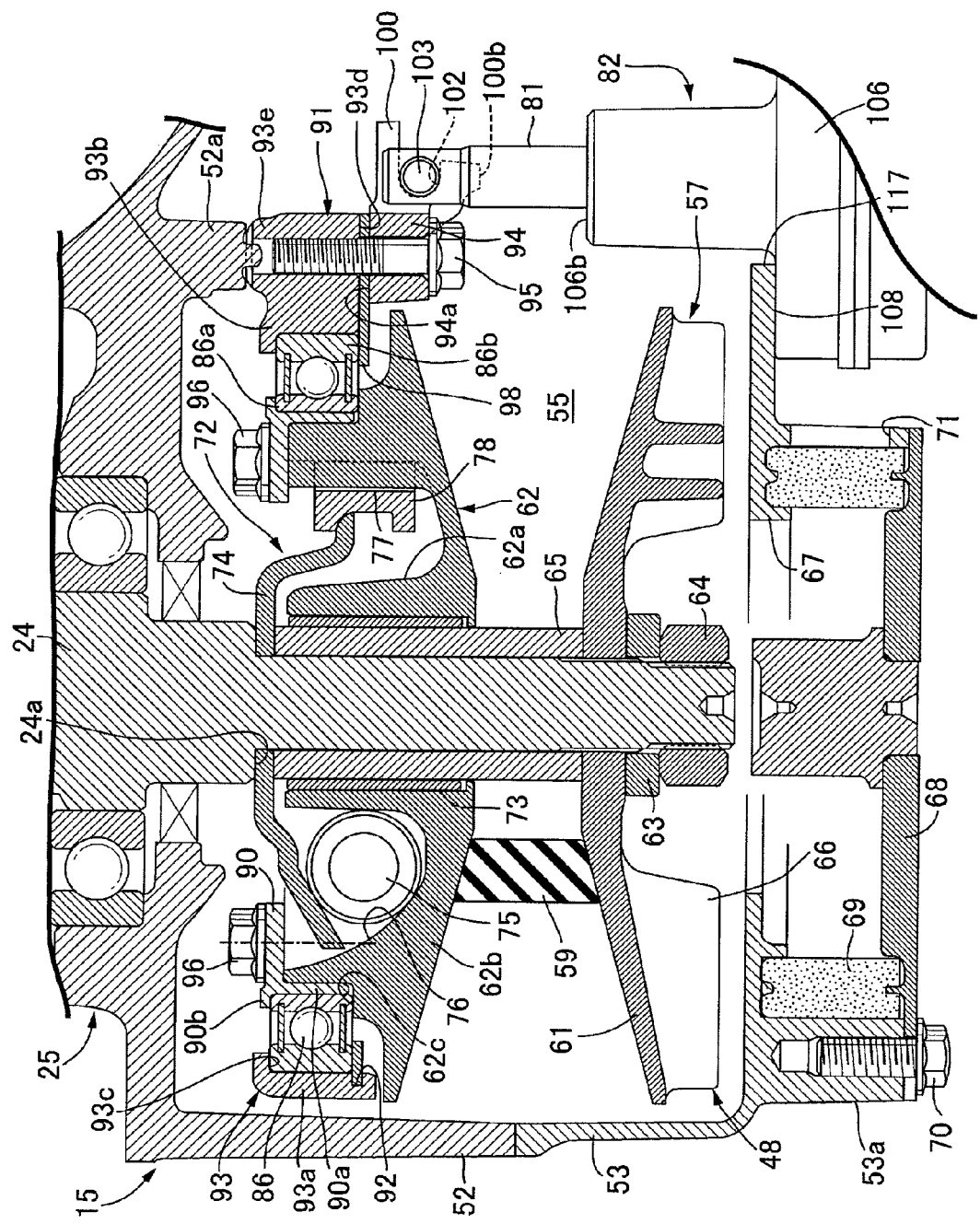
FIG. 4 is an enlarged view of the vicinity of a driving pulley of FIG. 3.

Referring to FIG. 4, the driving pulley 57 is composed of a fixed sheave 61 that is fixed to the crankshaft 24 and a movable sheave 62 that is movable toward or away from the fixed sheave 61 in a direction along the axis of the crankshaft 24 and supported by the crankshaft 24. The movable sheave 62 is disposed toward the crankcase 25 relative to the fixed sheave 61.

A nut 64 that sandwiches between the fixed sheave 61 and itself a washer 63 abutting on an inner peripheral portion of the fixed sheave 61 is threaded onto a left end of the crankshaft 24 toward the case cover 53 in the transmission case 15. On the other hand, an annular stepped portion 24a facing the fixed sheave 61 is formed on the outer periphery of an axially intermediate portion of the crankshaft 24 within the transmission chamber 55. A cylindrical sleeve 65 surrounding the crankshaft 24 is interposed between a weight holding plate 74, with an inner peripheral portion thereof abutting on the annular stepped portion 24a, and the fixed sheave 61. The fixed sheave 61 and the weight holding plate 74 are fixed to the crankshaft 24 by tightening the nut 64.

The fixed sheave 61 is integrally provided with a fan 66 for causing cooling air to circulate in the transmission chamber 55. The case cover 53 of the transmission case 15 is provided with an opening portion 67 at a position corresponding to the fixed sheave 61, and also integrally provided with a suction cylinder portion 53a surrounding the opening portion 67 and projecting outwardly. A lid member 68 for closing an outer end of the suction cylinder portion 53a is fastened to the suction cylinder portion 53a by a plurality of first bolts 70. A cylindrical cleaner element 69 that is continuous in an endless manner so as to surround the opening portion 67 is clamped between the lid member 68 and the case cover 53 so that it is disposed within the suction cylinder portion 53a. Also, a suction opening 71 is provided in a rear wall of the suction cylinder portion 53a.

The movable sheave 62 is made of a light alloy, such as aluminum, and integrally has a cylindrical boss portion 62a and a flange portion 62b. The boss portion 62a is axially movable and disposed coaxially with the crankshaft 24 while being supported by the crankshaft 24 through the sleeve 65. The flange portion 62b holds the V-belt 59 between the fixed sheave 61 and itself and radially outwardly overhangs from one end of the boss portion 62a to be formed in a bowl shape opening in the opposite direction to the fixed sheave 61. A cylindrical bushing 73 is interposed between the boss portion 62a and the sleeve 65.

The movable sheave 62 is driven toward the fixed sheave 61 with increases in rotational speed of the crankshaft 24 by the action of a centrifugal shift mechanism 72. The centrifugal shift mechanism 72 includes a cam face 76 formed on the opposite side of the flange portion 62b of the movable sheave 62 from the fixed sheave 61, the weight holding plate 74 fixed to the crankshaft 24 and facing the cam face 76 from the opposite direction of the movable sheave 62 and a weight 75 held between the cam face 76 and the weight holding plate 74.

Protrusions 77 projecting radially inwardly is integrally formed on a plurality of circumferential places on the inner periphery on the side of the flange portion 62b of the movable sheave 62 opposite from the fixed sheave 61. Also, clamping members 78 for clamping the protrusions 77 are mounted on a plurality of circumferential places on the outer periphery of the weight holding plate 74. The weight holding plate 74 and the movable sheave 62 rotate together with the crankshaft 24.

In this centrifugal shift mechanism 72, the weight 75 in rolling contact with the cam face 76 moves radially outwardly of the crankshaft 24 with increases in the centrifugal force acting with the rotation of the crankshaft 24, thereby moving the movable sheave 62 toward the fixed sheave 61.

The movable sheave 62 is also driven in the axial direction of the crankshaft 24 by power of an electric motor 80, serving as an actuator, in addition to the centrifugal shift mechanism 72. An actuator unit 82 that causes an output rod 81, serving as an output member, to move in a direction parallel to the axis of the crankshaft 24 with the power from the electric motor 80 is mounted on an outer surface of the case cover 53 of the transmission case 15.

A coupling arm 91 is supported by the movable sheave 62 through a ball bearing 86 serving as a rolling bearing. The output rod 81 is engageable with the coupling arm 91, and, with the output rod 81 engaged with and coupled to the coupling arm 91, the axial movement of the output rod 81 is transmitted to the movable sheave 62.

The coupling arm 91 is composed of a first member 93 mounted to the ball bearing 86; and a second member 94 engageable with the output rod 81 and mounted to the first member 93 by a second bolt 95 serving as a mounting member.

An inner ring 86a of the ball bearing 86 is supported by a bearing holder 90 mounted to an outer periphery of the flange portion 62b on the movable sheave 62 by a plurality of third bolts 96. The bearing holder 90 is integrally formed with a cylindrical cylinder portion 90a that is fitted on the inner periphery of the inner ring 86a to support the inner ring 86a and a flange portion 90b that sandwiches the inner ring 86a from both ends in the axial direction between an annular stepped portion 62c provided on the flange portion 62b and itself and projects radially outwardly from an end opposite from the annular stepped portion 62c.

Figure 5:
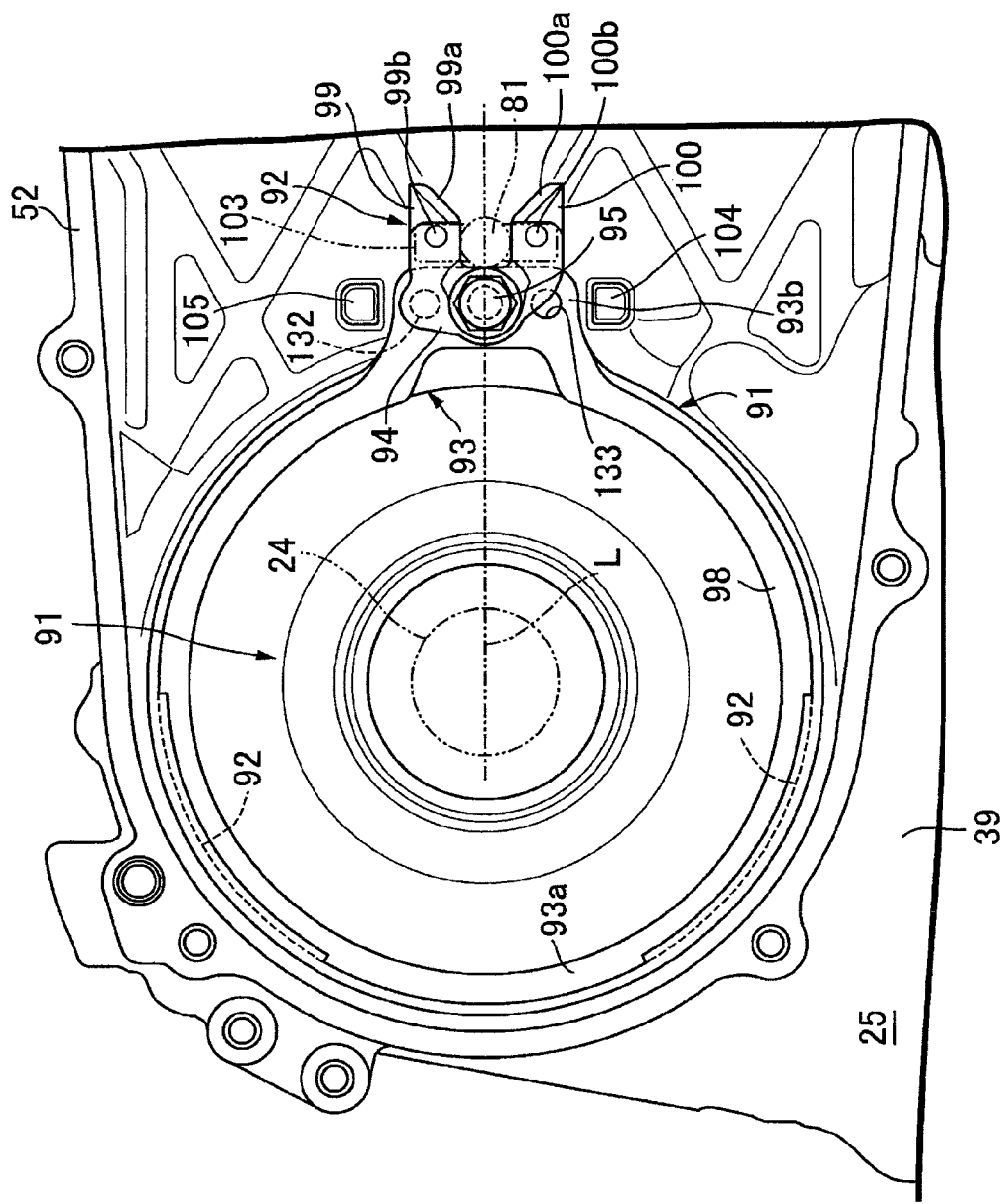
FIG. 5 is a view of an engaging/coupling state between a coupling arm and an output rod as viewed from an axial direction of a crankshaft.

Referring to FIG. 5, the first member 93 is formed of, for example, an aluminum alloy, and integrally has an annular portion 93a surrounding the ball bearing 86 and an extension portion 93b extending rearwardly from a rear portion of the annular portion 93a.

An outer ring 86b of the ball bearing 86, on which the annular portion 93a of the first member 93 is fitted, is clamped between an annular stepped portion 93c formed on an inner periphery of the annular portion 93a and an inner peripheral portion of an annular retaining plate 98, with a portion of the outer periphery of the retaining plate 98 being engaged in two circumferential engagement grooves 97 provided on the inner periphery of the annular portion 93a.

The second member 94 is formed of, for example, an iron based material, and fastened to the extension portion 93b by the second bolt 95 in such a manner so as to sandwich a portion of the retaining plate 98 between the extension portion 93b of the first member 93 and itself.

A mating surface 93d of the extension portion 93b of the first member 93 with the second member 94 and a mating surface 94a of the second member 94 with the extension portion 93b are along a plane perpendicular to the axis of the crankshaft 24. With a portion of the retaining plate 98 sandwiched between both mating surfaces 93d and 94a, the second member 94 is mounted to the first member 93 by a mounting operation from the outside in the vehicle width direction of the second bolt 95 having an axis parallel to the axis of the crankshaft 24.

In addition, as illustrated in FIG. 4, the second bolt 95 is located between the output rod 81 and the crankshaft 24 in a direction perpendicular to the axis of the crankshaft 24 and at the same time, disposed in a position in a radial direction of the crankshaft 24 and in overlapping relation with at least a portion of the output rod 81 (in this embodiment, a portion on the tip side of the output rod 81).

Furthermore, as shown in FIG. 2, the second bolt 95 is disposed on a straight line L connecting the axis of the crankshaft 24 and the axis of the driven shaft 60 disposed at the rear of the crankshaft 24.

Also, a boss portion 93e for mounting the second bolt 95 is formed on the extension portion 93b of the first member 93. As shown in FIG. 4, a moving end of the output rod 81 when moving in a direction to be extruded from the actuator unit 82 is restricted by abutment of the boss portion 93e on the case main body 52 of the transmission case 15. A restricting protrusion 52a allowing the boss portion 93e to abut thereon is integrally provided in a projecting manner on the case main body 52.

In addition, the second member 94 is mounted to the first member 93 by the single second bolt 95. Knock pins 132 disposed at a position offset from the axis of the second bolt 95 to pass through the retaining plate 98 are provided between the second member 94 and the first member 93 for preventing the second member 94 from turning around the axis of the second bolt 95. Furthermore, the first member 93 and the retaining plate 98 are formed symmetrically with respect to the straight line L, and thus available even if they are inverted by 180°. Therefore, holes 133 for fitting the knock pins 132 are formed in both the first member 93 and the retaining plate 98. The holes 133 are disposed on both sides of the second bolt 95.

Figure 6:
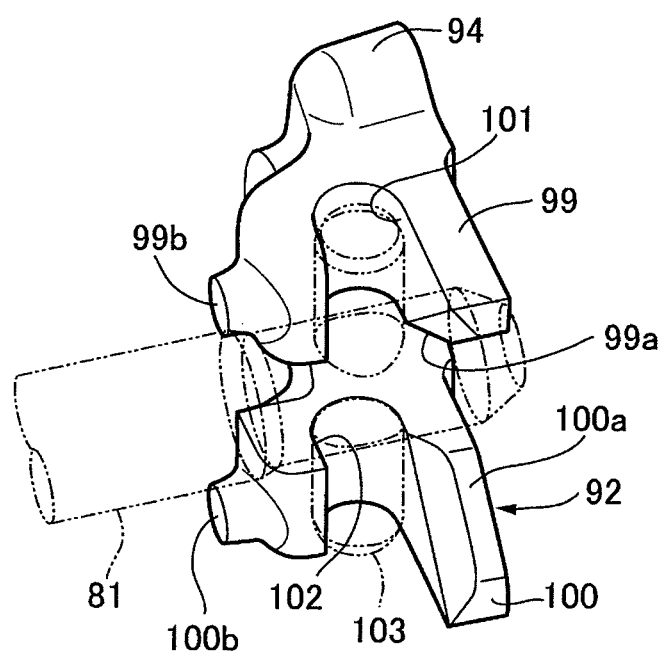
FIG. 6 is a perspective view of an engaged portion of the coupling arm.

Referring also to FIG. 6, the second member 94 of the coupling arm 91 is integrally provided with an engaged portion 92 located rearwardly in a vehicle front-rear direction of the second bolt 95. The engaged portion 92 is formed in substantially U shape, in which a pair of upper and lower arm portions 99 and 100 branched up and down from a rear end of the second member 94 so as to clamp the output rod 81 from upper and lower sides and disposed in substantially U shape is provided with locking recesses 101 and 102 opening rearwardly.

On the other hand, the output rod 81 is provided with an engaging portion 103 that is engageable with the locking recesses 101 and 102 of the engaged portion 92 from the rear along the vehicle front-rear direction. The engaging portion 103 is provided in such a manner so as to protrude vertically in a rod-like shape from the output rod 81.

A guide portion 99a, inclined upward with distance from the crankshaft 24, is formed on a lower surface of a leading end of the upper arm portion 99 out of the arm portions 99 and 100, and a guide portion 100a inclined downward with distance from the crankshaft 24 is formed on an upper surface of a leading end of the lower arm portion 100. More specifically, the leading ends (rear ends along the vehicle front-rear direction) of the arm portions 99 and 100 are formed with the guide portions 99a and 100a inclined so as to be separated from each other as going rearward while facing each other. The guide portions 99a and 100a guide the output rod 81 so that it is inserted between both arm portions 99 and 100 from the rear along the vehicle front-rear direction in such a manner so as to guide the engaging portion 103 of the output rod 81 to the side on which the engaging portion 103 is engaged in the locking recesses 101 and 102.

An arm supporting portion 104 is provided on the case main body 52 of the transmission case 15 in a manner extending in the axial direction of the crankshaft 24. The arm supporting portion 104 supports the coupling arm 91 by abutting from below on the extension portion 93b of the first member 93 of the coupling arm 91, with the engaging portion 103 disengaged from the engaged portion 92.

Furthermore, with the engaging portion 103 engaged with the engaged portion 92, the arm supporting portion 104 is separated from the coupling arm 91. The guide portion 99a of the lower surface of the upper arm portion 99 out of the pair of upper and lower arm portions 99 and 100 included in the engaged portion 92 abuts on the output rod 81 from above in the engagement process of the engaging portion 103 with the engaged portion 92, thereby separating the coupling arm 91 from the arm supporting portion 104. More specifically, by the abutment of the upper arm portion 99 on the output rod 81 from above in the engagement process of the engaging portion 103 with the engaged portion 92, the coupling arm 91 is turned so as to move the engaged portion 92 upwardly, thereby separating the coupling arm 91 from the arm supporting portion 104. The arm portion 99 is provided on the coupling arm 91 such that the coupling arm 91 is separated from the arm supporting portion 104 by the abutment of the arm portion 99 on the output rod 81.

In addition, an arm supporting portion 105 capable of abutting on the coupling arm 91 from above is provided on the case main body 52 of the transmission case 15 so as to form a vertical pair with the arm supporting portion 104. The arm supporting portion 105, cooperating with the arm supporting portion 104 located below the coupling arm 91, performs a function of preventing the coupling arm 91 from rotating around the axis of the crankshaft 24 when, with the axis of the crankshaft 24 along the vertical direction, the actuator unit 82 is installed in the transmission case 15 in a production plant.

It should be noted that the arm supporting portions 104 and 105 may be provided integrally with the case main body 52 or, alternatively, the arm supporting portion 104 and 105 may be constructed by implanting rod-like members into the case main body 52.

Figure 7:
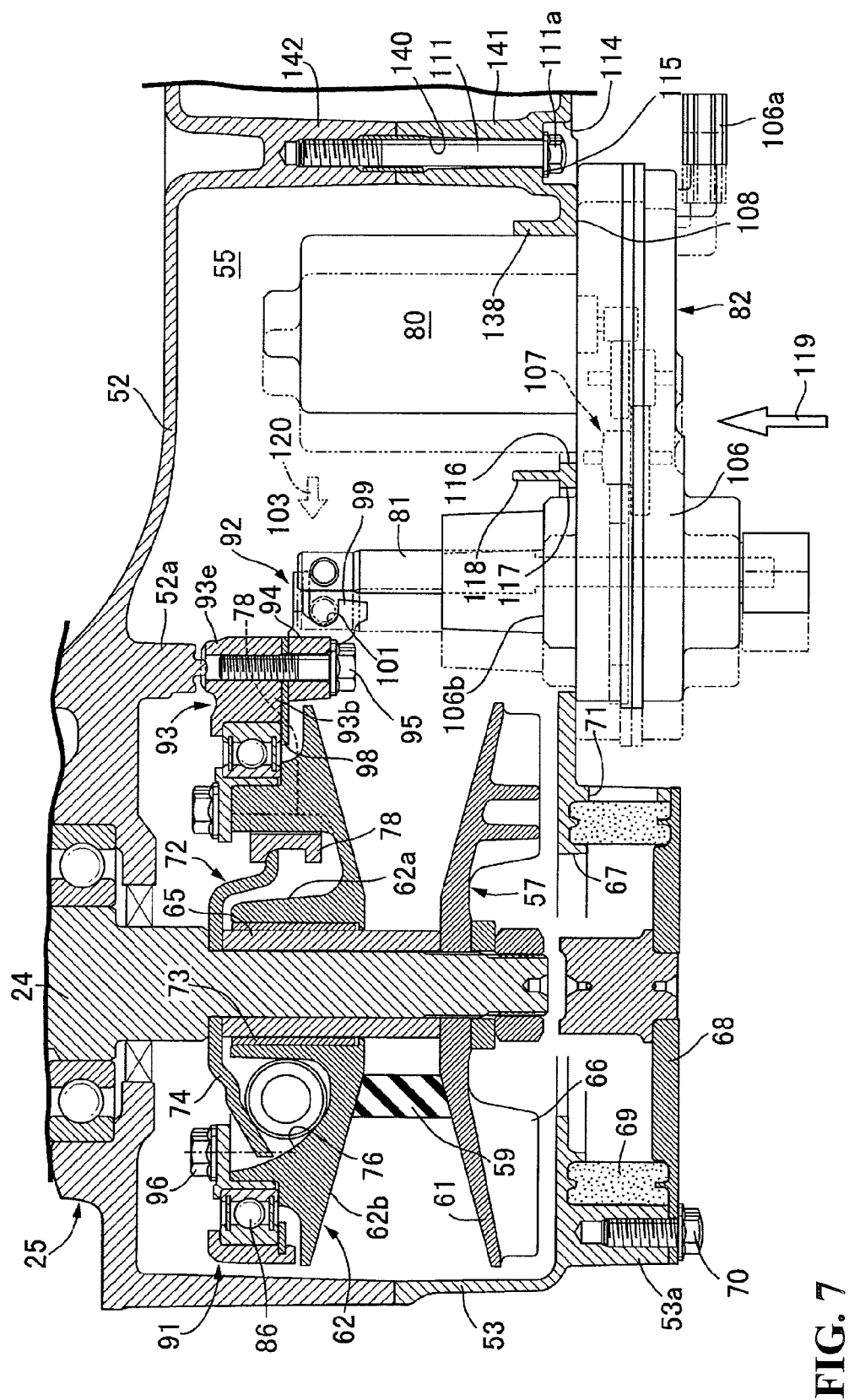
FIG. 7 is a view showing the essential parts of FIG. 3 for explaining an actuator unit installation process.

Referring also to FIG. 7, the actuator unit 82 has a unit case 106 mounted to an outer surface of the case cover 53 of the transmission case 15, and the electric motor 80 is mounted to the unit case 106 and protruded into the case cover 53. Also, the output rod 81 is axially movable in a direction parallel to the crankshaft 24 and projects into the case cover 53 while being supported by the unit case 106. A transmission mechanism 107 for converting rotary motion of the electric motor 80 into the axial movement of the output rod 81 is stored in the unit case 106.

The second member 94 of the coupling arm 91 is formed with stoppers 99b and 100b that abut on an outer surface of the actuator unit 82 mounted to the case cover 53 to thereby restrict a moving end of the output rod 81 when moving in a direction to be retracted into the actuator unit 82. In this embodiment, the stoppers 99b and 100b are integrally provided in a projecting manner on the pair of upper and lower arm portions 99 and 100 provided integrally with the second member 94. A n annular restricting surface 106b surrounding the output rod 81 is formed on the unit case 106 of the actuator unit 82 so as to allow the stoppers 99b and 100b to abut thereon.

Meanwhile, the moving end of the output rod 81 when moving in a direction to be extruded from the actuator unit 82 is restricted by abutment of the boss portion 93e on the restricting protrusion 52a of the case main body 52, and the moving end of the output rod 81 when moving in a direction to be retracted into the actuator unit 82 is restricted by abutment of the stoppers 99b and 100b on the annular restricting surface 106b. This movement of the output rod 81 to the restricting ends in both directions is for checking an initial position at the time of starting the engine E. In a normal shift range, the output rod 81 does not move to the restricting ends in both directions.

The actuator unit 82 is supported by the case cover 53 in a manner slidable in a direction perpendicular to the axis of the crankshaft 24 between an engagement position (shown by a chain line in FIG. 7), where it is mounted to the case cover 53 of the transmission case 15 from the outside by engaging the engaging portion 103 of the output rod 81 with the engaged portion 92 of the coupling arm 91 from the rear side relative to the second bolt 95, and a disengagement position (shown by a solid line in FIG. 7), where it is not mounted to the case cover 53 and the engaging portion 103 is disengaged from the engaged portion 92. A flat mounting surface 108 for mounting the actuator unit 82 is formed on an outer surface of the case cover 53.

The installation of the actuator unit 82 is performed only by, as indicated by a solid line arrow 119 in FIG. 7, causing the unit case 106 to abut on the mounting surface 108 in such a manner that the electric motor 80 and the output rod 81 project into the case cover 53 and setting the actuator unit 82 in the disengagement position, and then, as indicated by a chain line arrow 120 in FIG. 7, sliding the actuator unit 82 forward up to the engagement position and bringing the engaging portion 103 into engagement with the engaged portion 92, and in this state, fastening the unit case 106 to the mounting surface 108 with a plurality of, for example, four fourth bolts 109.

In addition, the transmission case 15 is composed of the case main body 52, the case cover 53, and the gear cover 54 which are fastened by a plurality of fastening members. In this embodiment, the case cover 53 is fastened to the case main body 52 by fifth bolts 110 serving as a plurality of fastening members that are arranged in spaced relation on the outer periphery of the case cover 53, a sixth bolt 111 serving as a fastening member that is threaded into a longitudinally intermediate portion of the case cover 53 between the crankshaft 24 and the driven shaft 60, and a seventh bolt 112 serving as a fastening member that is threaded into a rearward portion of the case cover 53 rearwardly of the driven shaft 60. Furthermore, the case main body 52 and the gear cover 54 are fastened to each other by eighth bolts 113 serving as a plurality of fastening members.

Out of the fifth to eighth bolts 110 to 113, the sixth bolt 111, which is a specific bolt disposed corresponding to the mounting surface 108, is disposed with a portion thereof overlapping a rear portion of the mounting surface 108 in a side view. A recessed portion 114 recessed inwardly of the case cover 53 from the mounting surface 108 is formed in the case cover 53 and has at an inner end thereof a fastening seat face 115 for the sixth bolt 111. The whole sixth bolt 111 is disposed inwardly of the case cover 53 from the mounting surface 108.

A cylindrical boss 141 that has a bolt insertion hole 140 continuous with the recessed portion 114 and projects toward the case main body 52 is integrally provided in a projecting manner on the case cover 53. A fastening boss 142 on which a leading end of the boss 141 abuts is integrally provided in a projecting manner on the case main body 52. The sixth bolt 111 is threaded into the bolt insertion hole 140 so that a radially enlarged head portion 111a engages and abuts on the fastening seat face 115 within the recessed portion 114, and is screw-threaded into the fastening boss 142. At this time, the whole radially enlarged head portion 111a of the sixth bolt 111 is stored in the recessed portion 114.

Furthermore, the unit case 106 of the actuator unit 82 is provided with a coupler 106a serving as a shielding portion that covers from the outside at least a portion of the recessed portion 114 in a state in which the actuator unit 82 being in the engagement position is mounted to the mounting surface 108. It should be noted that this shielding portion is not limited to the coupler 106a. Alternatively, a flange-like shielding wall may be formed on the unit case 106, which serves as the shielding portion.

Figure 8:
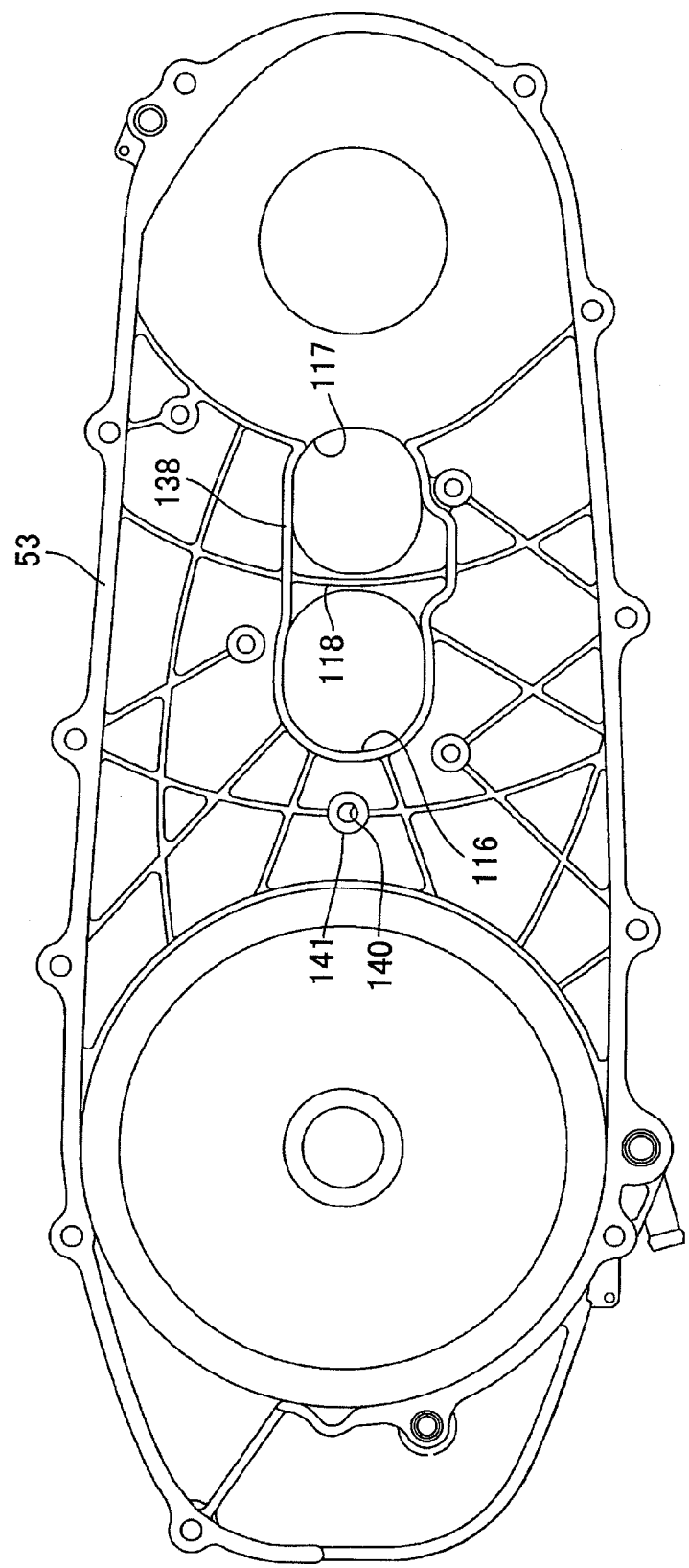
FIG. 8 is a view of a case cover as viewed from an inner surface thereof.

Referring to FIG. 8, a first through hole 116 allowing the insertion of the electric motor 80 and a second through hole 117 allowing the insertion of the output rod 81 are formed in spaced relation to each other in the mounting surface 108.

The first and second through holes 116 and 117 are each formed in an elongate hole shape elongated in the vehicle front-rear direction so as to allow sliding of the actuator unit 82.

Furthermore, a rib 118 disposed between the first and second through holes 116 and 117 is provided in a projecting manner on an inner surface of the case cover 53. Also, a rib 138 disposed in a manner surrounding the first and second through holes 116 and 117 is provided in a projecting manner on an inner surface of the case cover 53, and both ends of the rib 118 are continuous with the rib 138.

Referring again to FIG. 3, the driven pulley 58 is composed of a fixed sheave 121 that is fixed to a cylindrical inner cylinder 123 coaxially surrounding the driven shaft 60 and supported in a relatively rotatable manner by the driven shaft 60 and a movable sheave 122 that is movable toward or away from the fixed sheave 121 by being fixed to an outer cylinder 124, the outer cylinder 124 being movable in the axial direction and turnable relative to the inner cylinder 123 and coaxially surrounding the inner cylinder 123. The V-belt 59 is wound between the fixed sheave 121 and the movable sheave 122. A torque cam mechanism 125 is provided between the inner cylinder 123 and the outer cylinder 124 for applying a component force in the axial direction between both sheaves 121 and 122 in accordance with the difference in relative rotation phase between the fixed sheave 121 and the movable sheave 122. The movable sheave 122 is elastically urged toward the fixed sheave 121 by a coil spring 126. A centrifugal clutch 127 is provided between the fixed sheave 121 and the driven shaft 60. The centrifugal clutch 127 is switched to a power transmission state in response to the fact that engine speed exceeds a set value.

The axial distance between the fixed sheave 121 and the movable sheave 122 of the driven pulley 58 is determined by balance among an axial force generated by the torque cam mechanism 125, an axial elastic force generated by the coil spring 126, and a force from the V-belt 59 which is applied in a direction to increase the distance between the fixed sheave 121 and the movable sheave 122. When the winding radius of the V-belt 59 on the driving pulley 57 increases, the winding radius of the V-belt 59 on the driven pulley 58 decreases.

The driven shaft 60 liquid-tightly and rotatably passing through the case main body 52 has one end rotatably supported by the case cover 53 and the other end rotatably supported by the gear cover 54. One end of the axle 50 of the rear wheel WR airtightly passes through the gear cover 54 into the gear chamber 56. The axle 50 is rotatably supported on one end side thereof by the case main body 52 and the gear cover 54 and on the other end side thereof by the support arm 51.

The reduction gear mechanism 49 is provided between the driven shaft 60 and the axle 50 and stored in the gear chamber 56. The reduction gear mechanism 49 has a drive gear 128 integrally provided on the driven shaft 60 to which the rotational power from the crankshaft 24 is transmitted through the V-belt continuously variable transmission 48 and the centrifugal clutch 127, a final gear 129 provided on the axle 50 of the rear wheel WR, first and second idle gears 130 and 131 disposed between the final gear 129 and the drive gear 128.

Next, advantages of this first embodiment will be described. In order to constitute the coupling arm 91 supported by the movable sheave 62 through the ball bearing 86, the second bolt 95 for mounting the second member 94 engageable with the output rod 81 to the first member 93 is located between the output rod 81 and the crankshaft 24 in a direction perpendicular to the axis of the crankshaft 24. Therefore, the second bolt 95 can be disposed close to the crankshaft 24, thereby allowing a reduction in the loads applied to the coupling arm 91 in a portion where the second bolt 95 is disposed and allowing miniaturization of the coupling arm 91. In addition, because the second bolt 95 is disposed at a position overlapping at least a portion of the output rod 81 in the radial direction of the crankshaft 24, the coupling arm 91 can be also miniaturized in the axial direction of the crankshaft 24.

Further, the boss portion 93e for mounting the second bolt 95 is formed on the first member 93, and the moving end of the output rod 81 when moving in a direction to be extruded from the actuator unit 82 is restricted by abutment of the boss portion 93e on the restricting protrusion 52a of the transmission case 15. Thus, the number of components can be reduced by causing the boss portion 93e to serve also as a stopper. In addition, because the boss portion 93e is disposed at a position close to the crankshaft 24 relative to the output rod 81, even if a pressure is applied from the output rod 81 to the coupling arm 91 by a force more than required, the force applied in a direction in which the movable sheave 62 tilts can be reduced.

Moreover, the second member 94 is formed with the stoppers 99b and 100b that abut on the annular restricting surface 106b included in the outer surface of the unit case 106 of the actuator unit 82 to thereby restrict the moving end of the output rod 81 when moving in a direction to be retracted into the actuator unit 82. Thus, the number of components can be reduced by utilizing the outer surface of the unit case 106 of the actuator unit 82. In addition, because the stoppers 99b and 100b are disposed at a position close to the crankshaft 24 relative to the output rod 81, even if a pressure is applied from the output rod 81 to the coupling arm 91 by a force more than required, the force applied in a direction in which the movable sheave 62 tilts can be reduced.

Further, the crankshaft 24 with the axis extending in the vehicle width direction is supported by the transmission case 15 swingably supported by the body frame F together with the engine body 14 and extending in the front-rear direction. Also, the second member 94 having the mating surface 94a with the first member 93, which is along a plane perpendicular to the axis of the crankshaft 24, is mounted to the first member 93 by the mounting operation from the outside in the vehicle width direction of the second bolt 95 having the axis parallel to the axis of the crankshaft 24. Thus, access to the second bolt 95 from the outside is facilitated and the mounting workability of the second bolt 95 is improved.

Furthermore, the driven shaft 60 rotationally driven by the power transmitted from the V-belt 59 is disposed at the rear of the crankshaft 24 and stored in the transmission case 15. Also, the second bolt 95 is disposed on the straight line L connecting the axes of the crankshaft 24 ad the driven shaft 60. It is therefore possible to effectively prevent the V-belt 59 vertically swinging from interfering with the second bolt 95.

Moreover, the actuator unit 82 is supported by the case cover 53 of the transmission case 15 so that, with the output rod 81 disengaged and uncoupled from the coupling arm 91, the actuator unit 82 can advance from further rearward than the second bolt 95 to slide in a direction perpendicular to the axis of the crankshaft 24. The output rod 81 is engaged with and coupled to the coupling arm 91 in an advance position of the actuator unit 82. Thus, the second bolt 95 is prevented from becoming an obstacle in the sliding direction at the time of the slide movement of the actuator unit 82.

The actuator unit 82 is supported by the case cover 53 of the transmission case 15 slidably in a direction perpendicular to the axis of the crankshaft 24 between the engagement position located on the front side and the disengagement position located on the rear side. In the engagement position, the actuator unit 82 is mounted to the case cover 53 of the transmission case 15 from the outside by engaging the engaging portion 103 of the output rod 81 with the engaged portion 92 of the coupling arm 91 so as to allow transmission of the movement of the output rod 81 to the movable sheave 62. In the disengagement position, the actuator unit 82 is not mounted to the case cover 53 and the engaging portion 103 is disengaged from the engaged portion 92. The flat mounting surface 108 for mounting the actuator unit 82 is formed on an outer surface of the case cover 53. Also, the recessed portion 114 recessed inwardly of the case cover 53 from the mounting surface 108 is formed so as to have at an inner end thereof the fastening seat face 115 for the sixth bolt 111 out of the fifth to eighth bolts 110 to 113 for fastening the case main body 52, the case cover 53, and the gear cover 54 which constitute the transmission case 15, the sixth bolt 111 being disposed corresponding to the mounting surface 108. The whole sixth bolt 111 is disposed inwardly of the case cover 53 from the mounting surface 108. Thus, the sixth bolt 111 disposed on the periphery of the actuator unit 82 is prevented from projecting outward from the mounting surface 108. Thus, the actuator unit 82 can be brought into sliding contact with the whole mounting surface 108 including the portion where the recessed portion 114 is disposed. Consequently, a sufficient space for slidably moving the actuator unit 82 can be ensured and the mounting/dismounting workability of the actuator unit 82 can be enhanced.

Furthermore, the actuator unit 82 is provided with the coupler 106a serving as a shielding member for covering from the outside at least a portion of the recessed portion 114 in a state in which the actuator unit 82 being in the engagement position is mounted to the mounting surface 108. Thus, the fastening of the sixth bolt 111 can be hardly released unless the actuator unit 82 is removed from the transmission case 15. Also, with the engaging portion 103 on the side of the actuator unit 82 engaged with the engaged portion 92 on the side of the movable sheave 62, the transmission case 15 can be prevented from being forcibly disassembled.

Moreover, the first through hole 116 allowing the insertion of the electric motor 80 and the second through hole 117 allowing the insertion of the output rod 81 are formed in spaced relation to each other in the mounting surface 108. Thus, the rigidity of the case cover 53 can be enhanced by interposing a portion of the side wall of the case cover 53 between the first and second through holes 116 and 117. It is therefore possible to support the actuator unit 82 while sufficiently withstanding the load from the actuator unit 82 when the movable sheave 62 is moved in the axial direction of the crankshaft 24, and to accurately move the movable sheave 62 with the output rod 81.

In addition, the rib 118 disposed between the first and second through holes 116 and 117 is provided in a projecting manner on an inner surface of the case cover 53. Thus, the rigidity of the case cover 53 can be further enhanced.

Furthermore, the engaged portion 92 for engaging the engaging portion 103 provided on the output rod 81 is provided on the second member 94 of the coupling arm 91, and the guide portion 99a inclined upwardly with distance from the crankshaft 24 is formed on the engaged portion 92 for guiding the engaging portion 103. Thus, the engagement of the engaging portion 103 with the engaged portion 92 can be facilitated. Also, in this embodiment, the guide portion 100a inclined downwardly with a distance from the crankshaft 24, in addition to the guide portion 99a, is formed on the engaged portion 92 for guiding the engaging portion 103. Thus, the engagement of the engaging portion 103 with the engaged portion 92 can be further facilitated.

Moreover, the arm supporting portion 104, for supporting the coupling arm 91 by abutting on the coupling arm 91 from below with the engaging portion 103 disengaged from the engaged portion 92, is provided on the case main body 52 of the transmission case 15. It is therefore possible to support the coupling arm 91 in a predetermined position by supporting it with the arm supporting portion 104 from below with the engaging portion 103 disengaged from the engaged portion 92. Thus, when sliding the actuator unit 82 from the disengagement position to the engagement position, the engagement of the engaging portion 103 with the engaged portion 92 is facilitated and the mountability of the actuator unit 82 is enhanced.

Further, with the engaging portion 103 engaged with the engaged portion 92, the arm supporting portion 104 is spaced apart from the coupling arm 91. It is therefore possible to prevent the occurrence of wear and noise due to the sliding contact of the coupling arm 91 with the arm supporting portion 104 when the movable sheave 62 is driven in the axial direction by the movement of the output rod 81.

The arm portion 99, which abuts on the output rod 81 from above in the engagement process of the engaging portion 103 with the engaged portion 92, is provided on the coupling arm 91 so that the coupling aim 91 is separated from the arm supporting portion 104 by the abutment of the arm portion 99 on the output rod 81. Thus, when the output rod 81 is coupled to the coupling arm 91 by engaging the engaging portion 103 with the engaged portion 92, the coupling arm 91 is lifted and separated from the output rod 81, thereby allowing preventing the occurrence of wear and noise due to the sliding contact of the coupling arm 91 with the arm supporting portion 104.

A second embodiment of the present invention will be described with reference to FIGS. 9 to 12, in which portions corresponding to the above-described first embodiment are denoted by the same reference signs, and a repetition of the detailed description thereof is omitted.

Figure 9:
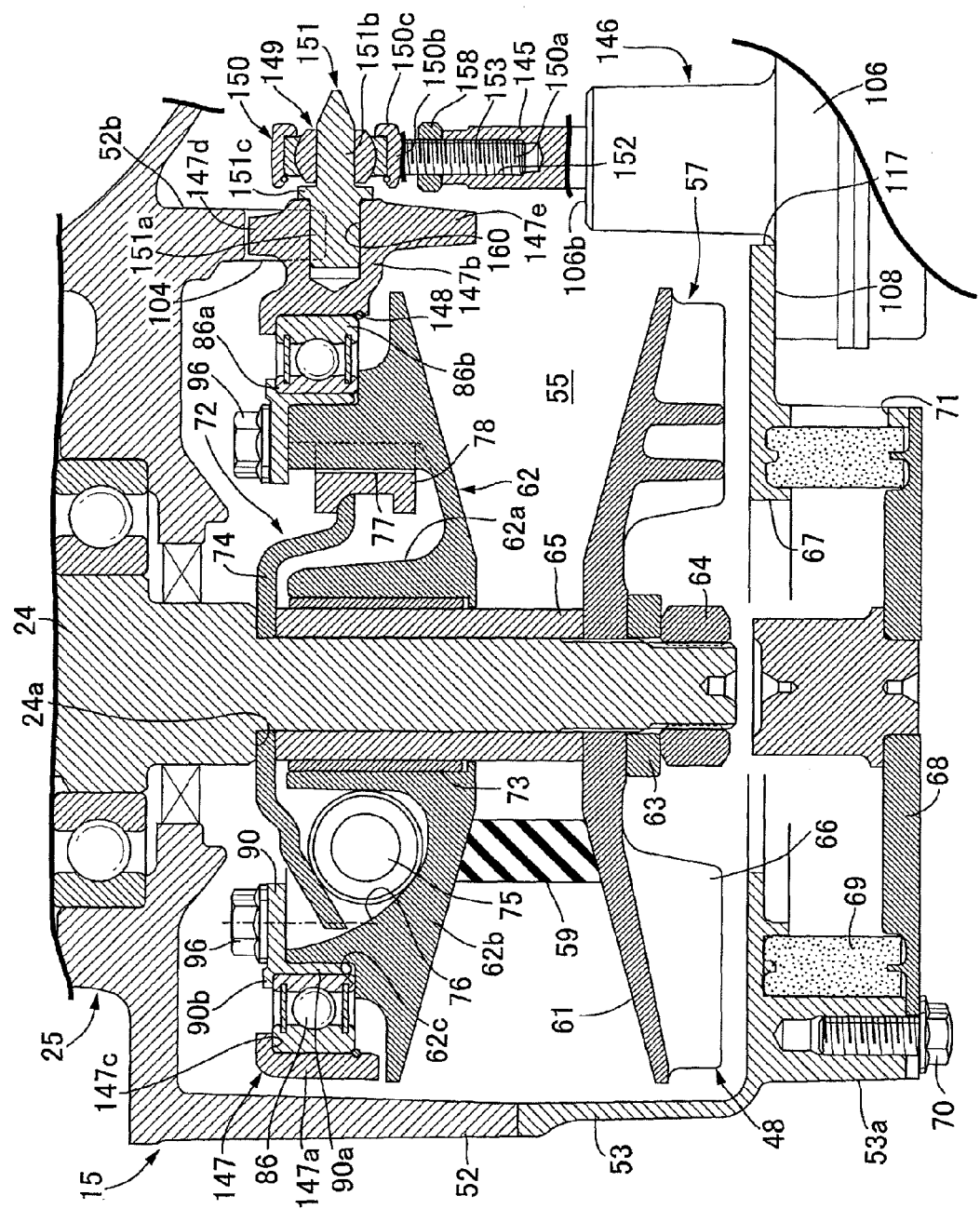
FIG. 9 is a sectional view of a second embodiment corresponding to FIG. 4.

Referring to FIG. 9, the unit case 106 of an actuator unit 146 having an output rod 145 is mounted to the mounting surface 108 formed on an outer surface of the case cover 53 of the transmission case 15, for causing the output rod 145 movable in a direction parallel to the axis of the crankshaft 24 to protrude into the transmission case 15 through the second through hole 117. The actuator unit 146 is of similar construction to the actuator unit 82 except that the shape of the output rod 145 is different from that of the output rod 81 of the actuator unit 82 according to the first embodiment.

On the other hand, on the movable sheave 62 of the driving pulley 57 of the V-belt continuously variable transmission 48, a coupling arm 147 for engagement with the output rod 145 is supported through the ball bearing 86.

The coupling arm 147 is formed of, for example, an iron based material, and integrally has an annular portion 147a that surrounds the ball bearing 86 and an extension portion 147b that extends rearwardly from a rear portion of the annular portion 147a.

The outer ring 86b of the ball bearing 86, which fits the annular portion 147a of the coupling arm 147, is clamped between an annular stepped portion 147c formed on an inner periphery of the annular portion 147a and a retaining ring 148 fitted into an inner periphery of the annular portion 147a.

The inner ring 86a of the ball bearing 86 is supported by the bearing holder 90 fastened to the outer periphery of the flange portion 62b on the movable sheave 62, in the same manner as the above-described first embodiment.

A first stopper 147d projecting toward the case main body 52 of the transmission case 15 is provided in a projecting manner on the extension portion 147b of the coupling arm 147. With the coupling arm 147 engaged with the output rod 145 of the actuator unit 146, the moving end of the output rod 145 when moving in a direction to be extruded from the actuator unit 146 is restricted by abutment of the first stopper 147d on a restricting protrusion 52b that is integrally provided on the case main body 52. Furthermore, a second stopper 147e projecting in the direction opposite to the first stopper 147d is provided in a projecting manner on the extension portion 147b. The moving end of the output rod 145 when moving in a direction to be retracted into the actuator unit 146 is restricted by abutment of the second stopper 147e on the annular restricting surface 106b that is formed on the unit case 106 of the actuator unit 146.

The extension portion 147b of the coupling arm 147 and the output rod 145 are engaged through a ball joint 149 that absorbs a force generated between the output rod 145 and the coupling arm 147 in a direction to tilt the movable sheave 62 along with the movement of the output rod 145.

Furthermore, the arm supporting portion 104 is provided on the case main body 52 of the transmission case 15 in a manner extending in the axial direction of the crankshaft 24. The arm supporting portion 104 supports the coupling arm 147 by abutting from below on the extension portion 147b of the coupling arm 147, with the engagement between the coupling arm 147 and the output rod 145 released.

The ball joint 149 is held by a holding member 150 coaxially fastened to the output rod 145. An engagement pin 151 disengageably engaged with the ball joint 149 is fixed with a press fit within the extension portion 147b of the coupling arm 147.

Figure 10:
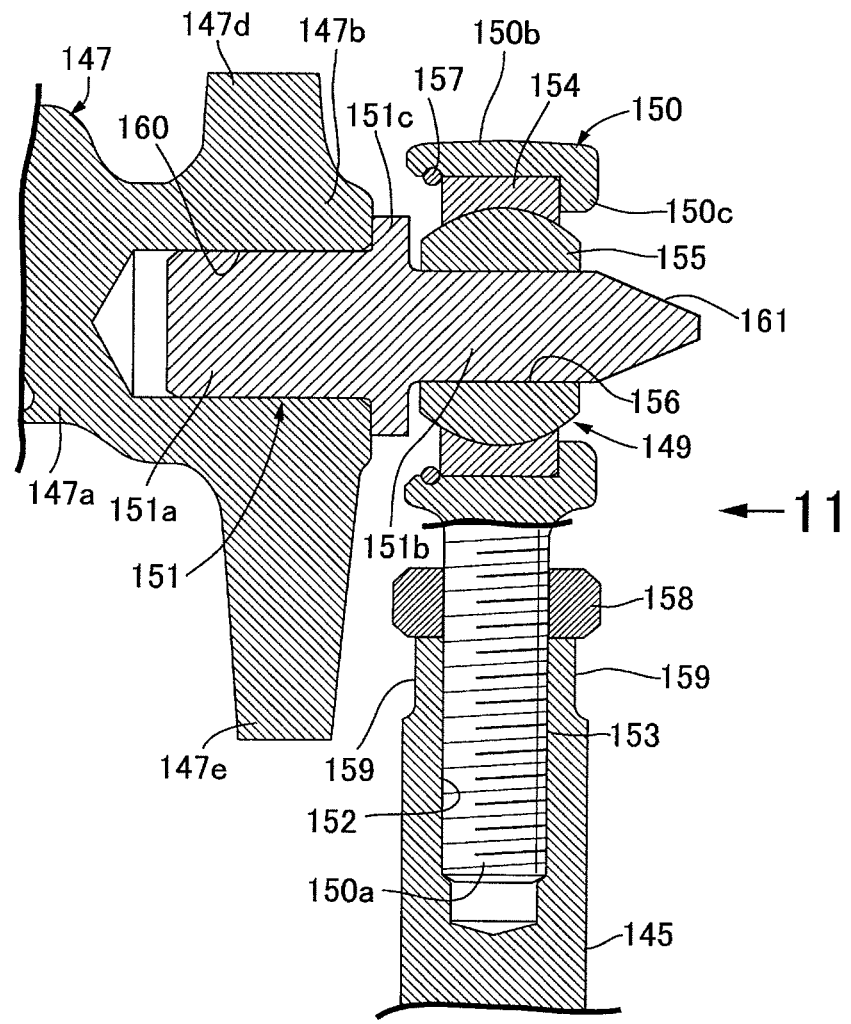
FIG. 10 is an enlarged view of the essential parts of FIG. 9.
Figure 11:
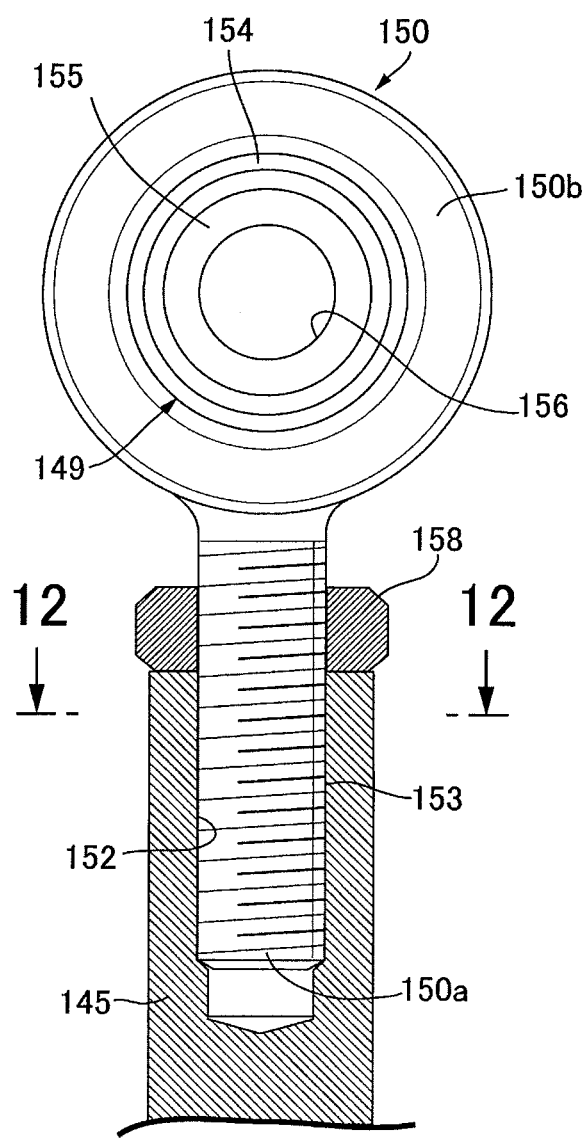
FIG. 11 is a view in the direction of the arrow 11 in FIG. 10.

Referring also to FIGS. 10 and 11, the holding member 150 is formed with a shaft portion 150a and an annular holding portion 150b. The shaft portion 150a is formed with external threads 153 engraved on the outer circumference thereof, the external threads 153 having threaded engagement with a bottomed threaded hole 152 having an opening in a leading end of the output rod 145 and coaxially provided in the output rod 145. The annular holding portion 150b is continuous with an end of the shaft portion 150a opposite the output rod 145.

The ball joint 149 is composed of a seat 154 that is fitted in the annular holding portion 150b of the holding member 150 and a ball 155 that is turnably held by the seat 154. An engagement hole 156 is provided in the ball 155. The seat 154 is clamped between an inward flange portion 150c integrally provided at an end of the annular holding portion 150b opposite the coupling arm 147 and a retaining ring 157 fitted into an inner periphery of the annular holding portion 150b.

A locknut 158 for engagement with the leading end of the output rod 145 is screwed onto the external threads 153 formed on the shaft portion 150a of the holding member 150. By screwing the shaft portion 150a into the threaded hole 152 and then tightening the locknut 158, the holding member 150 is fixed to the output rod 145. At this time, the holding member 150 is fixed to the output rod 145 in a position where the axis of the engagement hole 156 of the ball joint 149 held by the annular holding portion 150b is oriented in a front-rear direction.

Figure 12:
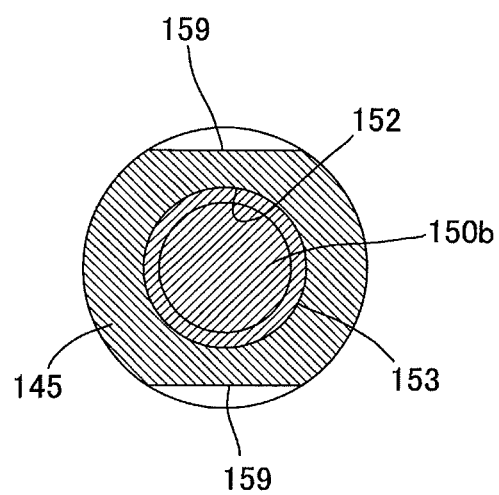
FIG. 12 is a sectional view taken along line 12-12 of FIG. 11.

Referring also to FIG. 12, a pair of engagement surfaces 159 parallel to each other along a plane perpendicular to a diameter line of the output rod 145 are formed on the outer circumference of a leading end of the output rod 145. At the time of the screwing operation for screwing the holding member 150 into the output rod 145, the output rod 145 is held by engagement of a tool (not shown) with the engagement surfaces 159, thereby allowing an improvement in installation property.

The engagement pin 151 is made of for example, an iron based material, and formed to coaxially and integrally have a press-fit shaft portion 151a, an engagement shaft portion 151b, and a flange portion 151c. The press-fit shaft portion 151a is press fitted into a bottomed press-fit hole 160 provided in the extension portion 147b of the coupling arm 147. The engagement shaft portion 151b is formed to have a diameter smaller than that of the press-fit shaft portion 151a so that it fits removably in the engagement hole 156 of the ball joint 149. The flange portion 151c sticks out radially from a continuous portion between the press-fit shaft portion 151a and the engagement shaft portion 151b to be brought into engagement with a leading end of the extension portion 147b.

A tapered surface 161 is formed at a leading end of the engagement shaft portion 151b for facilitating fitting of the engagement shaft portion 151b into the engagement hole 156. A taper angle of the tapered surface 161 is set so that the width tapers down toward the leading end, thereby facilitating fitting of the engagement shaft portion 151b into the engagement hole 156. It should be noted that, in place of the tapered surface 161, a leading end of the engagement shaft portion 151b may be formed in a spherical shape, or the engagement shaft portion 151b may be formed in a simple columnar shape having a uniform outer diameter over the entire length.

According to the second embodiment, the output rod 145 and the coupling arm 147 are engaged through the ball joint 149 that absorbs a force generated between the output rod 145 and the coupling arm 147 in a direction to tilt the movable sheave 62 along with the movement of the output rod 145. Thus, it is possible to prevent a high load on an engagement portion between the output rod 145 and the coupling arm 147 and contribute to an improvement in durability.

Furthermore, the ball joint 149 having the ball 155 with the engagement hole 156 is provided on the side of the output rod 145, while the engagement pin 151 is provided on the side of the coupling arm 147. Also, at the time of mounting/dismounting of the actuator unit 146 to/from the outer surface of the case cover 53 of the transmission case 15, the engagement pin 151 can be inserted into and removed from the engagement hole 156 by sliding the actuator unit 146 in the front-rear direction, thereby allowing an improvement in assembling property. In addition, the structure for engaging and disengaging the coupling arm 147 and the output rod 145 and the load absorbing structure can be simplified and miniaturized.

Figure 13:
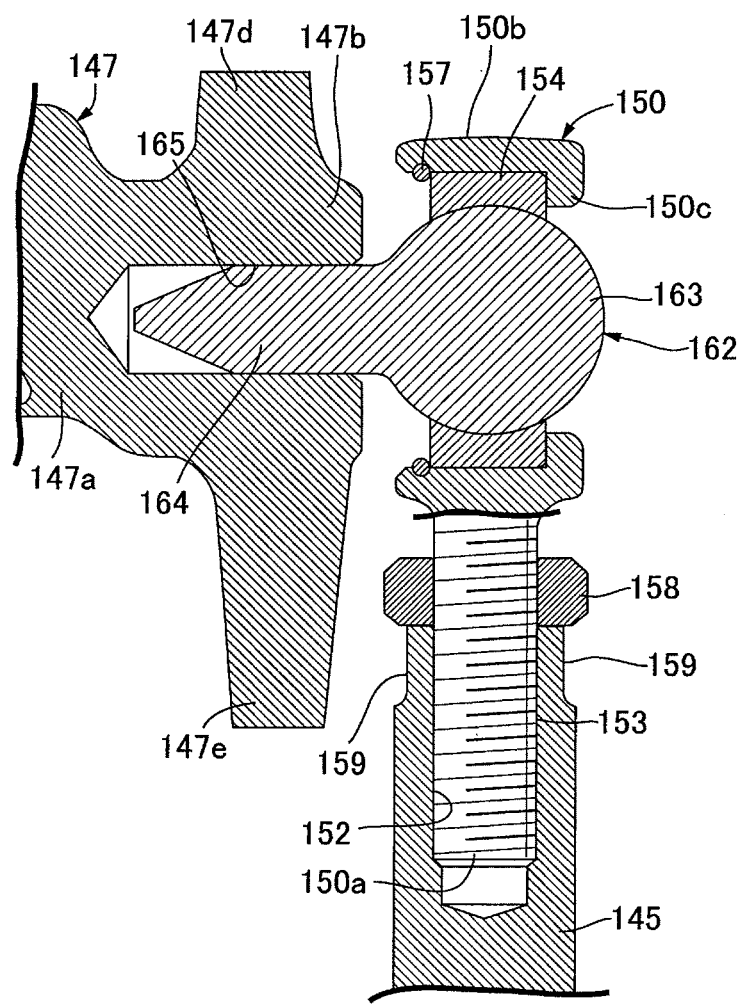
FIG. 13 is a sectional view of a third embodiment corresponding to FIG. 10.

As shown in FIG. 13 as a third embodiment of the present invention, a ball joint 162 held by the holding member 150 fixed to the output rod 145 is composed of the seat 154 that is fitted in the annular holding portion 150b of the holding member 150 and a ball 163 that is turnably held by the seat 154. The ball 163 may be integrally provided with an engagement pin 164 that fits removably in a bottomed engagement hole 165 provided in the extension portion 147b of the coupling arm 147. The third embodiment can also provide similar advantages to those of the second embodiment.

Figure 14:
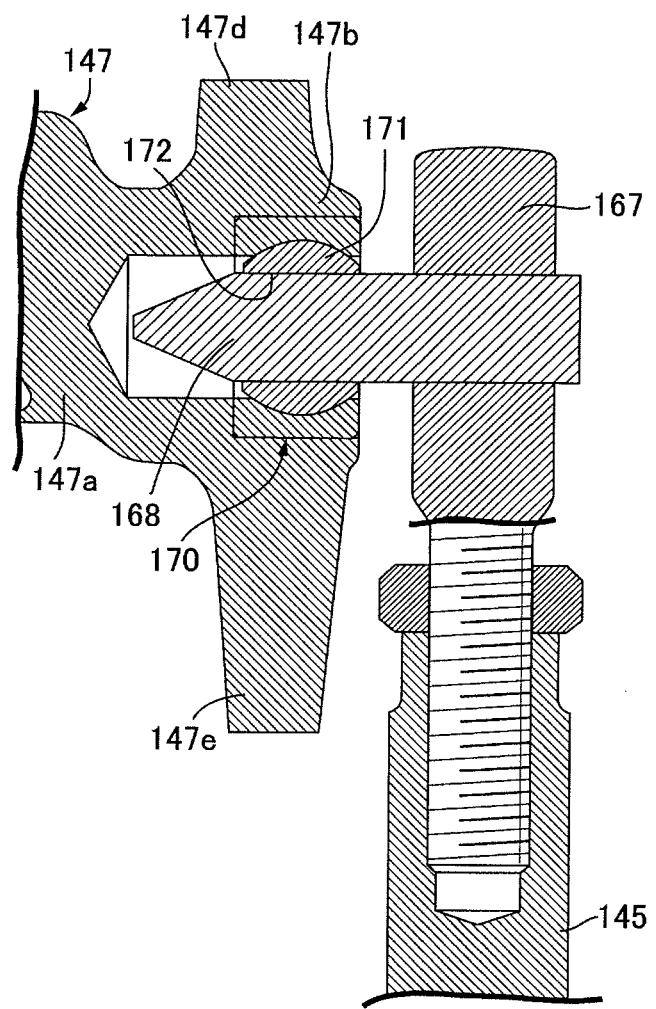
FIG. 14 is a sectional view of a fourth embodiment corresponding to FIG. 10.

FIG. 14 shows a fourth embodiment of the present invention, in which an engagement pin 168 is provided in a pin holding member 167 screwed into the output rod 145, while an engagement hole 172 in which the engagement pin 168 can fit removably is provided in a ball 171 of a ball joint 170 fitted into and held by the extension portion 147b of the coupling arm 147. The fourth embodiment can also provide similar advantages to those of the second embodiment.

Up to this point the embodiment according to the present invention have been described, but the present invention is not limited to the foregoing embodiment and various changes in design can be made without departing from the invention as set forth in the claims.

For example, in the foregoing embodiment, the second bolt 95 serving as a mounting member has the axis parallel to the axis of the crankshaft 24 and is mounted from the outside in the vehicle width direction, but also may be mounted from the inside in the vehicle width direction. Alternatively, the axis of the second bolt may be perpendicular to the axis of the crankshaft 24.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A V-belt continuously variable transmission comprising:
   a fixed sheave fixed to a driving shaft;
   a movable sheave movable toward or away from the fixed sheave in a direction along an axis of the driving shaft and supported by the driving shaft;
   a coupling arm supported by the movable sheave through a rolling bearing; and
   a V-belt wound between the fixed sheave and the movable sheave;
   the fixed sheave, the movable sheave, the coupling arm, and the V-belt being stored in a transmission case, the transmission case being formed by fastening a plurality of dividable case members with a plurality of fastening members;
   the V-belt continuously variable transmission further comprising an actuator unit for causing an output member to move in a direction parallel to the axis of the driving shaft with power from an actuator, the actuator unit being supported by the transmission case slidably in a direction perpendicular to the axis of the driving shaft between an engagement position, wherein the actuator unit is mounted to the transmission case from the outside by engaging the output member with the coupling arm so that the movement of the output shaft can be transmitted to the movable sheave, and a disengagement position, where the actuator unit is not mounted to the transmission case and the output member is disengaged from the coupling arm;
   wherein a flat mounting surface for mounting the actuator unit is formed on an outer surface of the transmission case;
   a recessed portion recessed inwardly of the transmission case from the mounting surface is formed to have at an inner end thereof a fastening seat face for a specific fastening member out of the plurality of fastening members, the specific fastening member being disposed at a portion corresponding to the mounting surface; and the whole specific fastening member is disposed inwardly of the transmission case relative to the mounting surface.

2. The V-belt continuously variable transmission according to claim 1, wherein the actuator unit is provided with a shielding member for covering from the outside at least a portion of the recessed portion in a state in which the actuator unit being in the engagement position is mounted to the mounting surface.

3. The V-belt continuously variable transmission according to claim 2, wherein a first through hole allowing insertion of the actuator and a second through hole allowing insertion of the output member are formed in spaced relation to each other in the mounting surface.

4. The V-belt continuously variable transmission according to claim 2, wherein the transmission case extending in a vehicle front-rear direction is supported on a body frame of a saddle-ride vehicle and provided with an arm supporting portion for supporting the coupling arm by abutting on the coupling arm from below with the output member disengaged from the coupling arm.

5. The V-belt continuously variable transmission according to claim 2, wherein the output member and the coupling arm are engaged through a ball joint for absorbing a force generated between the output member and the coupling arm in a direction to tilt the movable sheave along with the movement of the output member.

6. The V-belt continuously variable transmission according to claim 1, wherein a first through hole allowing insertion of the actuator and a second through hole allowing insertion of the output member are formed in spaced relation to each other in the mounting surface.

7. The V-belt continuously variable transmission according to claim 6, wherein a rib disposed between the first and second through holes is provided in a projecting manner on an inner surface of the transmission case.

8. The V-belt continuously variable transmission according to claim 1, wherein the transmission case extending in a vehicle front-rear direction is supported on a body frame of a saddle-ride vehicle and provided with an arm supporting portion for supporting the coupling arm by abutting on the coupling arm from below with the output member disengaged from the coupling arm.

9. The V-belt continuously variable transmission according to claim 8, wherein, with the output member engaged with the coupling arm, the arm supporting portion is separated from the coupling arm.

10. The V-belt continuously variable transmission according to claim 9, wherein an arm portion abutting on the output member from above in an engagement process of the output member with the coupling arm being provided on the coupling arm so that the coupling arm is separated from the arm supporting portion by abutment of the arm portion on the output member.

11. The V-belt continuously variable transmission according to claim 1, wherein the output member and the coupling arm are engaged through a ball joint for absorbing a force generated between the output member and the coupling arm in a direction to tilt the movable sheave along with the movement of the output member.

12. A V-belt continuously variable transmission according to claim 1, wherein said coupling arm is composed of a first member and a second member, the first member being mounted to the rolling bearing, the second member being engageable with the output member and mounted to the first member by a mounting member;

said mounting member being located between the output shaft and the driving shaft in a direction perpendicular to the axis of the driving shaft and disposed in a position overlapping at least a portion of the output shaft in a radial direction of the driving shaft.

13. The V-belt continuously variable transmission according to claim 12, wherein the first member is formed with a boss portion for mounting the mounting member, and a moving end of the output member when moving in a direction to be extruded from the actuator unit is restricted by abutment of the boss portion on the transmission case.

14. The V-belt continuously variable transmission according to claim 12, wherein the second member is formed with stoppers that abut on an outer surface of the actuator unit to thereby restrict a moving end of the output member when moving in a direction to be retracted into the actuator unit.

15. The V-belt continuously variable transmission according to claim 12, wherein the transmission case extending in a vehicle front-rear direction is supported on a body frame of a saddle-ride vehicle; the driving shaft having an axis extending in a vehicle width direction is supported by the transmission case and the second member having a mating surface with the first member is mounted to the first member by a mounting operation of the mounting member from outside in the vehicle width direction, the mating surface being along a plane perpendicular to the axis of the driving shaft, the mounting member having an axis parallel to the axis of the driving shaft.

16. The V-belt continuously variable transmission according to claim 15, wherein a driven shaft rotationally driven by power transmitted from the V-belt is disposed rearwardly of the driving shaft and stored in the transmission case and the mounting member is disposed on a straight line connecting the axes of the driving shaft and the driven shaft.

17. The V-belt continuously variable transmission according to claim 15, wherein the actuator unit is supported by the transmission case so that, with the output member disengaged and uncoupled from the coupling arm, the actuator unit can advance from further rearward than the mounting member to slide in the direction perpendicular to the axis of the driving shaft, and the output rod is engaged with and coupled to the coupling arm in an advance position of the actuator unit.

18. The V-belt continuously variable transmission according to claim 17, wherein an engaged portion for engaging an engaging portion provided on the output member is provided on the second member and formed with a guide portion that is inclined upward with distance from the driving shaft for guiding the engaging portion.

19. A V-belt continuously variable transmission comprising:
a fixed sheave fixed to a driving shaft;
a movable sheave movable toward or away from the fixed sheave in a direction along an axis of the driving shaft and supported by the driving shaft;
a coupling aim supported by the movable sheave through a rolling bearing and provided with an engaged portion; and
a V-belt wound between the fixed sheave and the movable sheave;
the fixed sheave, the movable sheave, the coupling arm, and the V-belt being stored in a transmission case, the transmission case being formed by fastening a plurality of dividable case members with a plurality of fastening members;

the V-belt continuously variable transmission further comprising an actuator unit for causing an output member provided with an engaging portion engageable with the engaged portion to move in a direction parallel to the axis of the driving shaft with power from an actuator, the actuator unit being supported by the transmission case slidably in a direction perpendicular to the axis of the driving shaft between an engagement position, wherein the actuator unit is mounted to the transmission case from the outside by engaging the engaging portion with the engaged portion so as to allow transmission of the movement of the output member to the movable sheave, and a disengagement position, where the actuator unit is not mounted to the transmission case and the engaging portion is disengaged from the engaged portion;

wherein a flat mounting surface for mounting the actuator unit is formed on an outer surface of the transmission case;

a recessed portion recessed inwardly of the transmission case from the mounting surface is formed to have at an inner end thereof a fastening seat face for a specific fastening member out of the plurality of fastening members, the specific fastening member being disposed at a portion corresponding to the mounting surface; and the whole specific fastening member is disposed inwardly of the transmission case relative to the mounting surface.

20. The V-belt continuously variable transmission according to claim 19, wherein an arm portion abutting on the output member from above in an engagement process of the engaging portion with the engaged portion is provided on the coupling arm so that the coupling arm is separated from the arm supporting portion by abutment of the arm portion on the output member.

* * * * *